(12) United States Patent
Yang et al.

(10) Patent No.: US 10,864,889 B2
(45) Date of Patent: Dec. 15, 2020

(54) VEHICLE OPERATING METHOD AND VEHICLE OPERATING APPARATUS

(71) Applicant: Samsung Electronics Co., Ltd., Suwon-si (KR)

(72) Inventors: Hye-jung Yang, Yongin-si (KR); Bo-seok Moon, Gunpo-si (KR); Mu-sik Kwon, Seoul (KR); Jong-hyun Kim, Suwon-si (KR); Hae-in Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 15/830,916

(22) Filed: Dec. 4, 2017

(65) Prior Publication Data

US 2018/0157534 A1 Jun. 7, 2018

(30) Foreign Application Priority Data

Dec. 7, 2016 (KR) .................. 10-2016-0166203

(51) Int. Cl.
| | | |
|---|---|---|
| *G06F 9/44* | (2018.01) | |
| *B60R 25/24* | (2013.01) | |
| *G06F 9/50* | (2006.01) | |
| *G06F 21/56* | (2013.01) | |
| *H04L 29/06* | (2006.01) | |

(Continued)

(52) U.S. Cl.
CPC .......... *B60R 25/241* (2013.01); *G06F 9/5027* (2013.01); *G06F 9/5038* (2013.01); *G06F 9/5077* (2013.01); *G06F 21/44* (2013.01); *G06F 21/554* (2013.01); *G06F 21/56* (2013.01); *G06F 21/629* (2013.01); *H04L 63/105* (2013.01); *H04L 67/12* (2013.01); *H04W 12/08* (2013.01); *G06F 2209/503* (2013.01); *G06F 2221/033* (2013.01)

(58) Field of Classification Search
CPC ....................................... G06F 9/44
See application file for complete search history.

(56) References Cited

U.S. PATENT DOCUMENTS

| 8,996,864 B2 | 3/2015 | Maigne et al. |
| 9,086,929 B2 * | 7/2015 | Bailey ................. H04L 67/1025 |

(Continued)

FOREIGN PATENT DOCUMENTS

| KR | 10-2016-0136138 A | 11/2016 |
| KR | 10-2016-0136591 A | 11/2016 |
| WO | 2016/063016 A2 | 4/2016 |

OTHER PUBLICATIONS

Extended European Search Report dated Nov. 7, 2019, issued in European Application No. 17879428.5.

*Primary Examiner* — Jae U Jeon
(74) *Attorney, Agent, or Firm* — Jefferson IP Law, LLP

(57) ABSTRACT

A vehicle operating apparatus is provided. The vehicle operating apparatus includes a memory configured to store data generated in association with an operation of a vehicle, and a processor configured to perform communication connection to a first external device, determine a first authorization level of the first external device, determine a second authorization level corresponding to a task according to characteristics of the task for performing the operation of the vehicle, and assign the task to a second external device corresponding to the second authorization level.

19 Claims, 19 Drawing Sheets

(51) Int. Cl.
*G06F 21/55* (2013.01)
*G06F 21/44* (2013.01)
*H04L 29/08* (2006.01)
*G06F 21/62* (2013.01)
*H04W 12/08* (2009.01)

(56) References Cited

U.S. PATENT DOCUMENTS

| | | | |
|---|---|---|---|
| 9,185,114 B2 * | 11/2015 | Banerjee | G06F 9/5077 |
| 2004/0235452 A1 * | 11/2004 | Fischer | H04L 63/104 |
| | | | 455/410 |
| 2005/0165854 A1 * | 7/2005 | Burnett | G06F 9/505 |
| 2006/0152348 A1 | 7/2006 | Ohtaki et al. | |
| 2007/0143762 A1 * | 6/2007 | Arnold | G06F 9/5044 |
| | | | 718/103 |
| 2013/0290399 A1 * | 10/2013 | Gordon | H04L 67/1097 |
| | | | 709/201 |
| 2014/0094987 A1 | 4/2014 | Healey et al. | |
| 2014/0114497 A1 * | 4/2014 | Miyake | H04L 9/32 |
| | | | 701/1 |
| 2014/0244069 A1 | 8/2014 | Yang | |
| 2015/0150023 A1 * | 5/2015 | Johnson | G06F 9/5027 |
| | | | 718/107 |
| 2016/0255154 A1 | 9/2016 | Kim et al. | |
| 2016/0288905 A1 * | 10/2016 | Gong | G06F 21/31 |
| 2016/0306350 A1 * | 10/2016 | Shim | G07C 9/00309 |

* cited by examiner

VEHICLE OPERATING METHOD AND VEHICLE OPERATING APPARATUS

CROSS-REFERENCE TO RELATED APPLICATION(S)

This application claims the benefit under 35 U.S.C. § 119(a) of a Korean patent application filed on Dec. 7, 2016 in the Korean Intellectual Property Office and assigned Serial number 10-2016-0166203, the entire disclosure of which is hereby incorporated by reference.

TECHNICAL FIELD

The present disclosure relates to a vehicle operating method and a vehicle operating apparatus. More particularly, the present disclosure relates to a vehicle operating method for performing communication connection to at least one external device by determining an authorization level of the at least one external device.

BACKGROUND

With the development of network and communication technologies, virtualization techniques have been developed which logically integrate physically different systems, or logically divide a system to efficiently use resources.

In addition, when a user operates a vehicle, there is an increasing demand not only for moving efficiently to a destination but also for performing various tasks in the vehicle. However, due to the limitations of hardware and/or software capacity of the vehicle, it is difficult for the vehicle to perform various tasks in accordance with the demands of the user.

Therefore, a need exists for performing communication connection to at least one external device by determining an authorization level of the at least one external device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide vehicle operating methods and vehicle operating apparatuses.

Another aspect of the present disclosure is to provide a non-transitory computer-readable recording media having recorded thereon programs for performing the vehicle operating methods on a computer.

Additional aspects will be set forth in part in the description which follows and, in part, will be apparent from the description, or may be learned by practice of the presented embodiments.

In accordance with an aspect of the present disclosure, a vehicle operating apparatus is provided. The vehicle operating apparatus includes a memory configured to store data generated in association with an operation of a vehicle, and a processor configured to perform communication connection to a first external device, determine a first authorization level of the first external device, determine a second authorization level corresponding to a task according to characteristics of the task for performing an operation of the vehicle, and assign the task to a second external device corresponding to the second authorization level.

In accordance with another aspect of the present disclosure, a vehicle operating method is provide. The method includes performing communication connection to a first external device, determining a first authorization level of the first external device, determining a second authorization level corresponding to a task according to characteristics of the task for performing an operation of a vehicle, and assigning the task to a second external device corresponding to the second authorization level.

In accordance with another aspect of the present disclosure, at least one non-transitory computer-readable recording medium having recorded thereon a program for performing the vehicle operating method on a computer is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
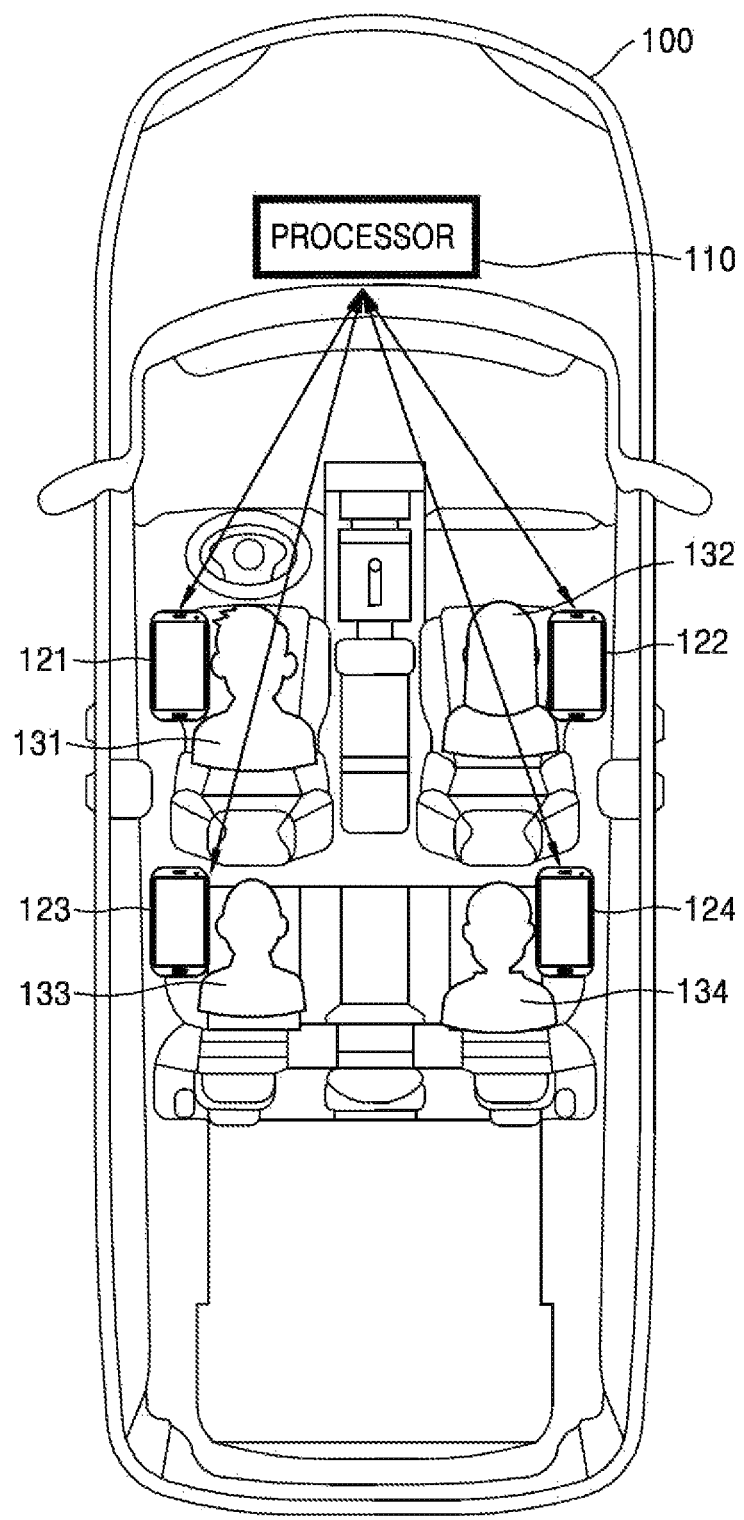
FIG. 1 is a diagram illustrating a vehicle and external devices according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms as used herein are those general terms currently widely used in the art by taking into account functions in the present disclosure, but the terms may vary according to the intention of those of ordinary skill in the art, precedents, or new technology in the art. In addition, specified terms may be selected by the applicant, and in this case, the detailed meaning thereof will be described in the detailed description of the present disclosure. Thus, the terms used herein should be understood not as simple names but based on the meaning of the terms and the overall description of the present disclosure.

It will also be understood that the terms "comprises", "includes", and "has", when used herein, specify the presence of stated elements, but do not preclude the presence or addition of other elements, unless otherwise defined. In addition, the terms "unit" and "module" as used herein represent a unit for processing at least one function or operation, which may be implemented by hardware, software, or a combination of hardware and software.

The embodiments will be described with reference to the accompanying drawings in such a manner that the embodiments may be easily carried out by those of ordinary skill in the art. However, the present disclosure may be implemented in various forms and is not limited to the embodiments.

Hereinafter, embodiments of the present disclosure will be described with reference to the accompanying drawings.

FIG. 1 is a diagram illustrating a vehicle and external devices according to an embodiment of the present disclosure.

Referring to FIG. 1, a processor 110 included in a vehicle 100 and external devices 121, 122, 123, and 124 are illustrated. The processor 110 may be included in one of various devices installed in the vehicle 100. Specifically, the device may be a device embedded in the vehicle 100, or may be a device detachably attached to the vehicle 100. For example, the device may be a center information display (CID) of the vehicle 100, but embodiments of the present disclosure are not limited thereto.

In addition, the external devices 121, 122, 123, and 124 may be devices owned by a driver 131 and passengers 132, 133, and 134. Examples of the external devices 121, 122, 123, and 124 may include a smartphone, a tablet, a personal computer (PC), a wearable device, and the like. For convenience of description, four persons are illustrated as the passengers of the vehicle 100, but embodiments of the present disclosure are not limited thereto. In other words, only the driver 131 may get in the vehicle 100, and the number of the passengers 132, 133, and 134 is not limited to three.

The vehicle 100 performs various operations. For example, the vehicle 100 may run or stop, operate a wiper, or operate an air conditioner. In addition, the CID of the vehicle 100 may display images (for example, still image or moving images) captured by a camera installed in the vehicle 100, or may execute a navigation program. In addition, the CID may reproduce a variety of content (for example, music, video, and the like) downloaded from the outside.

On the other hand, the types of operations performed by the vehicle 100 may be limited, or the operations may not be smoothly performed, depending on specifications of various devices installed in the vehicle 100. The specifications may correspond to a data processing speed, a data throughput, a data download speed, a data storage space, idle power, and the like. For example, the device may simply display images captured by the camera of the vehicle 100 and may not analyze the images or give various effects to the images, depending on hardware and/or software specifications of the device (for example, CID). In addition, the device may not be able to quickly download a large amount of content.

The processor 110 may allow the vehicle 100 to perform operations by utilizing not only the specifications of the devices installed in the vehicle 100 but also available resources of the external devices 121, 122, 123, and 124. In other words, the processor 110 may perform communication connection with the external devices 121, 122, 123, and 124 and assign a task to at least one of the external devices 121, 122, 123, and 124.

The task describes a detailed procedure required for the vehicle 100 to perform operations. In other words, the operation describes the function of the vehicle 100 (for example, a navigation function, an advanced driver assistant system (ADAS) function, a parking assist function, or the like), and the task describes a detailed procedure for executing the function of the vehicle 100. As an example, when assuming that the operation is to display an image captured by the camera of the vehicle 100, the task may be a procedure of processing image signals to generate a still image file or a moving image file. As another example, when assuming that the operation is to reproduce content, the task may be a procedure of downloading content from the outside.

On the other hand, the processor 110 may determine authorization levels of the external devices 121, 122, 123, and 124 and assign tasks to a part of the external devices 121, 122, 123, and 124 according to the authorization levels. The authorization level describes a level of authorization indicating ability or inability to access data generated in association with the operation of the vehicle 100. For example, the authorization level may be set by the processor 110 without external intervention, or may be set by a user input.

The data generated in association with the operation of the vehicle 100 may be data generated by the vehicle 100, internal devices (cameras or the like) of the vehicle 100, or devices installed in the vehicle 100 according to the operation of the vehicle 100. In addition, the data generated according to the operation of the vehicle 100 may be data that the device installed in the vehicle 100 acquires through communication between the vehicle 100 and vehicle peripheral devices (cameras or the like). In addition, the data generated according to the operation of the vehicle 100 may be data regenerated by analyzing data that the device installed in the vehicle 100 acquires through communication. The communication may include in-vehicle network communication (controller area network (CAN) communication or the like), wireless communication, wired communication, and the like, and embodiments of the present disclosure are not limited thereto. In other words, the data generated in association with the operation of the vehicle 100 describes data generated (or regenerated) according to the operation of the vehicle 100 (or the device installed in the vehicle 100).

For example, the vehicle 100 may store image signals generated by the camera of the vehicle 100 in the memory. In this case, it is necessary to use the image signals stored in the memory so as to generate an image. The processor 110 may provide the image signals to only an external device having a high authorization level among the external devices 121, 122, 123, and 124, or may allow the external device to read the image signals from the memory.

It may be necessary to limit external devices capable of accessing information generated while the vehicle 100 is traveling among pieces of data stored in the vehicle 100. The information generated while the vehicle 100 is traveling refers to information related to the traveling of the vehicle 100, for example, a vehicle speed and ADAS information (presence or absence of a preceding vehicle, or the like). The information may be information that the device installed in the vehicle 100 acquires through in-vehicle network (CAN communication or the like), and may be information regenerated by analyzing the acquired information in the device installed in the vehicle 100.

For example, when a problem occurs in the vehicle 100, the safety of the passengers of the vehicle 100 may be threatened. In addition, since information of the driver 131 may be stored in the vehicle 100, it may be necessary to prevent leakage of personal information. Therefore, the processor 110 may allow only an external device having a high authorization level among the external devices 121, 122, 123, and 124 to access information generated while the vehicle 100 is traveling among pieces of data stored in the vehicle 100. Accordingly, the security of the data stored in the vehicle 100 may be further enhanced.

The processor 110 grants authorization levels for the external devices 121, 122, 123, and 124 to access the data generated in association with the operation of the vehicle 100 (the data stored in the memory of the vehicle 100) according to the authorization levels set to the external devices 121, 122, 123, and 124. For example, the processor 110 may grant an external device, to which "Level 1" is set, an authorization level to access the data generated in association with the operation of the vehicle 100, and may prevent an external device, to which "Level 2" is set, from accessing the data generated in association with the operation of the vehicle 100.

On the other hand, the processor 110 may partition system resources of a computing system (for example, CID) including the processor 110 into virtual zones, and may set the external device to access only a specific virtual zone among the virtual zones according to the authorization level of the external device. The system resources denote hardware or software, such as a processor, a memory, and a storage included in the computing system. In addition, the virtual zone denotes a portion in which hardware or software is divided. For example, the virtual zone may denote a portion of maximum computing capacity of the processor, or a portion of total storage capacity of the memory, storage, or the like. The processor 110 may designate accessible virtual zones according to each authorization level. For example, the processor 110 may divide the system resources into "Zone 1" and "Zone 2". The external device(s), to which Level 1 is set, may be allowed to access Zone 1 and Zone 2, and the external device(s), to which Level 2 is set, may be allowed to access only Zone 2. Therefore, the external device(s), to which Level 1 is set, may perform tasks corresponding to Zone 1 and Zone 2, and the external device(s), to which Level 2 is set, may perform tasks corresponding to Zone 2. In other words, the processor 110 may use a virtualization technique to designate the virtual zone(s) that is accessible according to the authorization levels of the external devices 121, 122, 123, and 124. In addition, the virtual zones accessible by the external devices 121, 122, 123, and 124 may be set according to a user's selection. For example, the user may designate the external device(s), to which Level 1 is set, to be allowed to access only Zone 1, and designate the external device(s), to which Level 2 is set, to be allowed to access only Zone 2. Accordingly, the security of the data stored in the vehicle 100 may be further enhanced.

The processor 110 may assign tasks only to the external device(s), to which Level 1 is set, among the external devices 121, 122, 123, and 124, or may assign tasks to the entire external devices, depending on the type of tasks. In addition, when there are a plurality of external devices to which tasks can be assigned, the processor 110 may assign tasks according to the order determined among the external devices. In addition, the processor 110 may divide tasks to be performed and distribute the tasks to the external devices. Furthermore, the processor 110 may assign tasks to all or part of the external devices 121, 122, 123, and 124 by taking into account the available resources of the external devices 121, 122, 123, and 124.

The processor 110 may change a task execution subject according to a change in the available resources of the external devices 121, 122, 123, and 124 or the communication state between the external devices 121, 122, 123, and 124 and the processor 110. As one example, the processor 110 may assign the task assigned to the first external device 121 to the second external device 122 according to a change in the available resources of the external devices 121, 122, 123, and 124. As another example, when the communication connection between the third external device 123 and the processor 110 is disconnected after the processor has assigned the task to the third external device 123, the processor 110 may assign the task assigned to the third external device 123 to the fourth external device 124.

In addition, the processor 110 may determine whether malicious software has been installed on the external devices 121, 122, 123, and 124 periodically or when the external devices 121, 122, 123, and 124 are connected. The processor 110 may not assign tasks to the external devices, on which malicious software has been installed, among the external devices 121, 122, 123, and 124.

Examples in which the processor 110 assigns tasks to the external devices 121, 122, 123, and 124 will be described with reference to FIGS. 2, 3, 4, 5, 6, 7, 8, 9, 10, 11, 12, 13, 14, 15, and 16.

Figure 2:
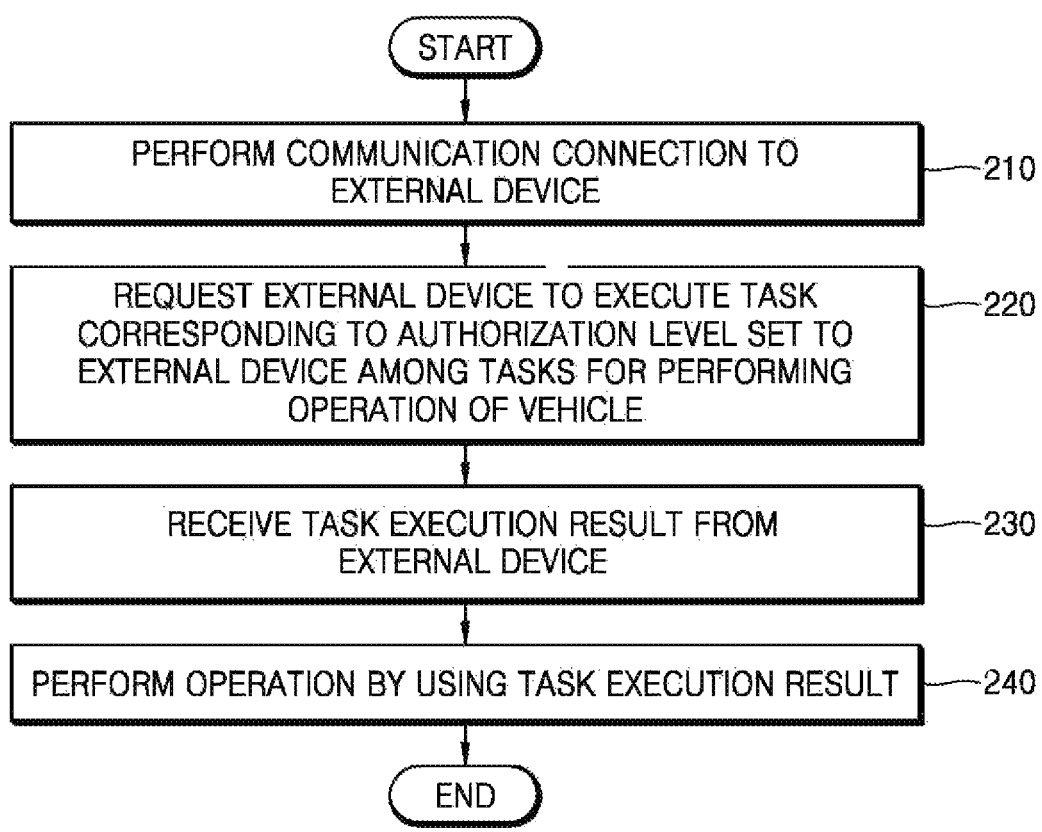
FIG. 2 is a flowchart of a method by which a processor assigns a task to at least one external device according to an embodiment of the present disclosure.

FIG. 2 is a flowchart of a method by which a processor assigns a task to at least one external device according to an embodiment of the present disclosure.

Referring to FIG. 2, the flowchart includes operations that are processed in time series by the processor 110 of FIG. 1. Therefore, even if omitted below, the description provided in connection with the operation of the processor 110 of FIG. 1 may also be applied to the flowchart of FIG. 2.

In operation 210, the processor 110 performs communication connection to the external device.

For example, the processor 110 may be connected to the external device via a wireless communication scheme or a wired communication scheme. In addition, when there are a plurality of external devices that are connectable to the processor 110, the processor 110 may select some of the external devices and be connected to the selected external devices.

Examples in which the processor 110 performs communication connection to the external devices will be described with reference to FIGS. 3 and 4.

Figure 3:
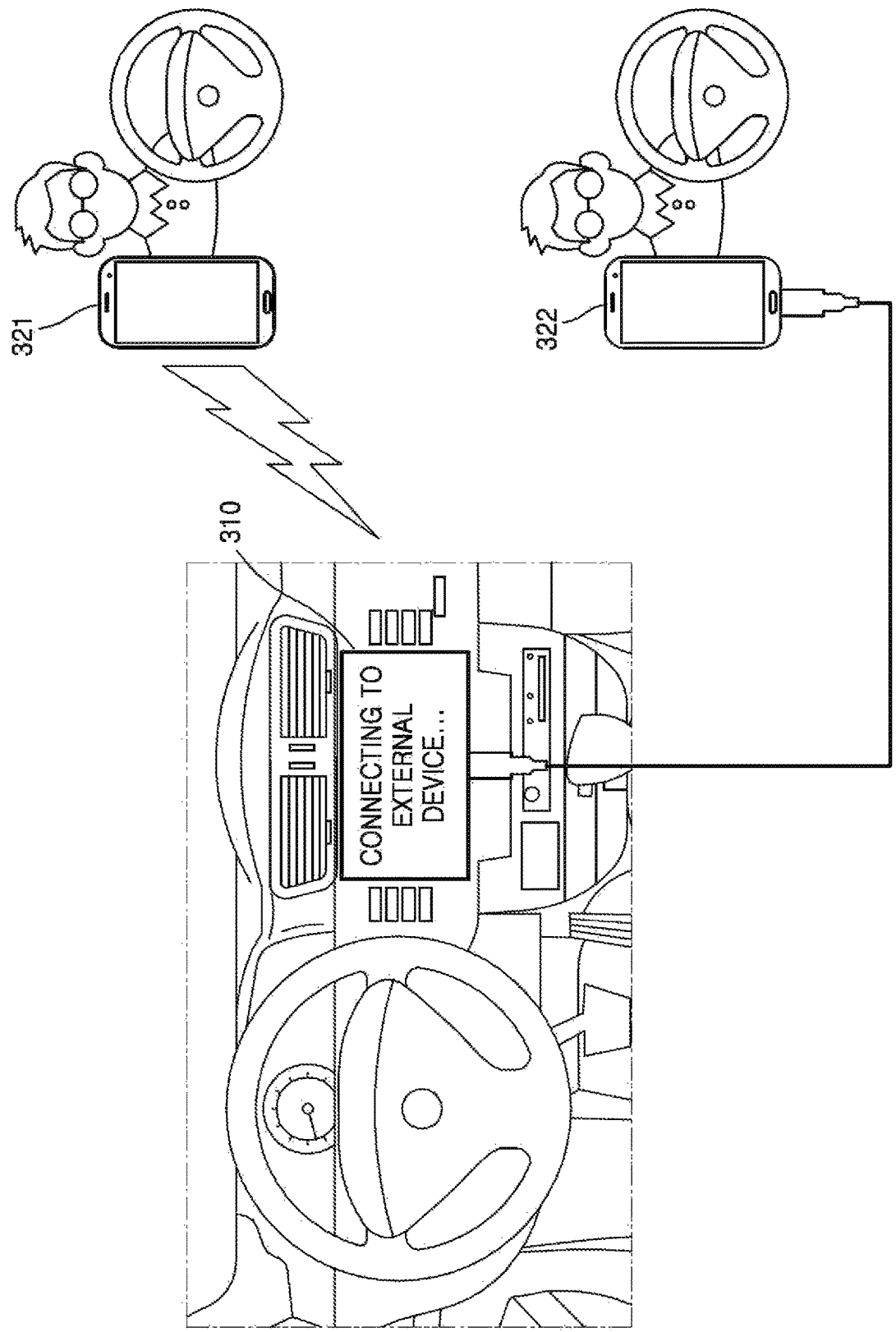
FIG. 3 is a diagram illustrating a processor being connected to external devices according to an embodiment of the present disclosure.

FIG. 3 is a diagram illustrating a processor being connected to external devices according to an embodiment of the present disclosure.

Referring to FIG. 3, the processor 110 may connect a device 310 including the processor 110 to external devices 321 and 322 via a wireless communication scheme or a wired communication scheme. For example, the processor 110 may be included in the device 310 installed in the vehicle, and the processor 110 may control a communicator of the device 310 to connect the device 310 to the external devices 321 and 322.

As one example, the device 310 may be connected to the external device 321 via a wireless communication scheme. Examples of the wireless communication scheme may include near field communication (NFC), ZigBee, Bluetooth (BT), and ultra-wideband (UWB), but embodiments of the present disclosure are not limited thereto.

As another example, the device 310 may be connected to the external device 322 via a cable. A case where the device 310 is connected to the external device 322 via a USB scheme is illustrated in FIG. 3, but embodiments of the present disclosure are not limited thereto. In other words, any scheme may be used in embodiments of the present disclosure as long as the device 310 and the external device 322 are connected via a cable to perform data communication.

When there are a plurality of external devices 321 and 322 to be connected to the device 310, the processor 110 may select external devices 321 and 322 to be connected to the device 310.

Figure 4:
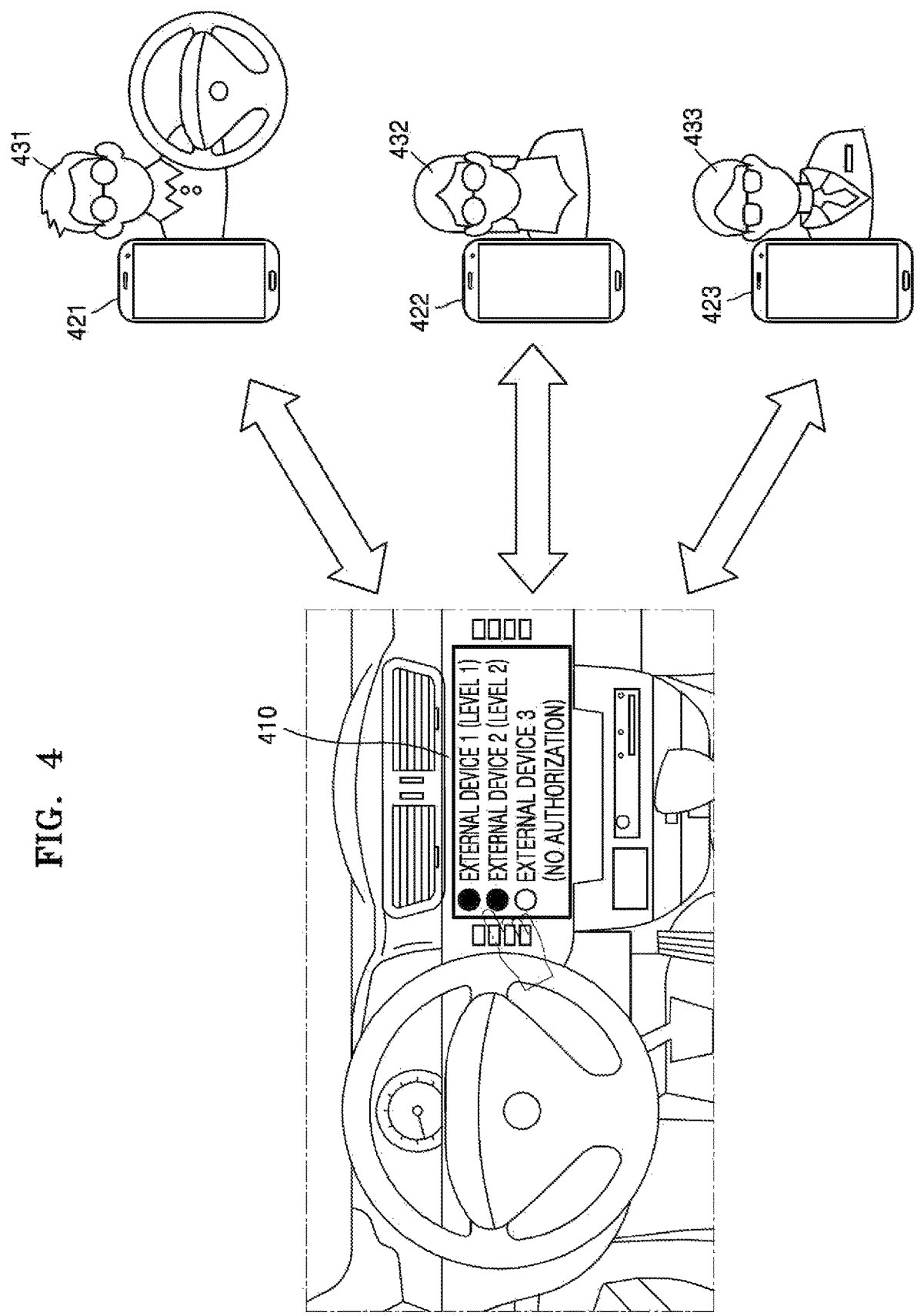
FIG. 4 is a diagram illustrating a processor selecting an external device to be connected to a device of a vehicle from among a plurality of external devices according to an embodiment of the present disclosure.

FIG. 4 is a diagram illustrating a processor selecting external devices to be connected to a device of a vehicle from among a plurality of external devices according to an embodiment of the present disclosure.

Referring to FIG. 4, a plurality of external devices 421, 422, and 423 connectable to a device 410 including the processor 110 are illustrated. The external devices 421, 422, and 423 may be devices owned by a driver 431 and passengers 432 and 433.

The processor 110 may search for the external devices 421, 422, and 423 in the vehicle 100. In addition, the processor 110 may select external devices to be connected to the device 410 from among the external devices 421, 422, and 423.

As one example, the processor 110 may output the found external devices 421, 422, and 423 on a screen of the device 410, and connect the external devices 421 and 422 selected by a user (for example, the driver 431) to the device 410. As another example, if the external device 421 is previously set to be always connected to the device 410, the processor 110 may connect the external device 421 to the device 410 without asking the user about the connection.

Information about the authorization levels set to the external devices 421, 422, and 423 may be output on the screen of the device 410. For example, when it is assumed that Level 1 and Level 2 are respectively set to the external device 421 and the external device 422 before the device searching, the processor 110 may output the authorization levels set to the external devices 421 and 422 on the screen. If no authorization level is previously set to the external device 423, the processor 110 may output, on the screen of the device 410, a notification window indicating that no authorization level is set to the external device 423.

Referring to FIG. 2 again, in operation 220, the processor 110 determines the authorization level of the connected external device. In operation 230, the processor 110 determines an authorization level corresponding to a task according to characteristics of a task for performing the operation of the vehicle. The characteristics of the task denote whether information generated while the vehicle is traveling is used. In other words, the processor 110 determines an authorization level corresponding to a task according to whether the information generated while the vehicle is traveling is used when the task is executed.

In operation 240, the processor 110 may assign a task to an external device corresponding to the determined authorization level.

When the vehicle 100 performs one operation, a plurality of tasks may be required. For example, when it is assumed that the vehicle 100 performs an operation of outputting an image captured by the camera of the vehicle 100, a task of processing image signals generated by the camera, a task of encoding and decoding an image, and the like may be required. In addition, when it is assumed that the vehicle 100 performs an operation of reproducing content, a task of downloading the content and the like may be required.

The processor 110 assigns a task to an external device according to an authorization level set to the external device. Therefore, an authorization level corresponding to each task must be preset to each task. In other words, a task that can be executed by an external device having an authorization level of Level 1 and a task that can be executed by an external device having an authorization level of Level 2 must be preset. For example, the processor 110 may preset a task requiring data generated in association with the operation of the vehicle 100 as a task corresponding to Level 1, and may preset a task not requiring data generated in association with the operation of the vehicle 100 as a task corresponding to Level 2 as well as Level 1.

In addition, the processor 110 may set an authorization level of an external device. For example, the processor 110 may set an authorization level of an external device before performing communication connection for task assignment. If an external device, to which no authorization level is set, is connected, the processor 110 may set the authorization level of the connected external device as a default value (for example, Level 2).

Examples in which the processor 110 assigns an external device a task corresponding to an authorization level set to the external device will be described with reference to FIGS. 5, 6, 7, 8, and 9.

Figure 5:
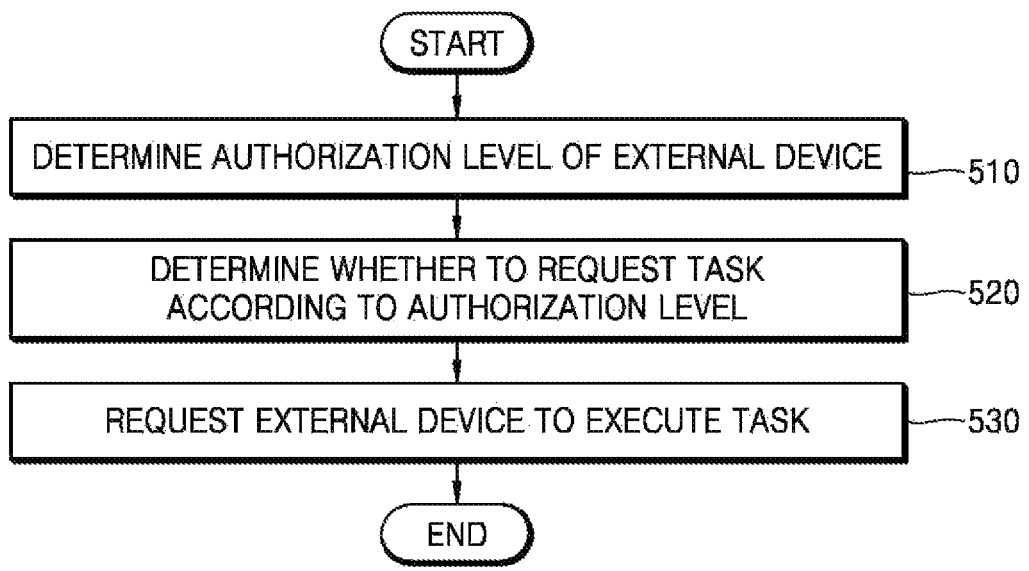
FIG. 5 is a flowchart illustrating a processor assigning a task to an external device according to an embodiment of the present disclosure.

FIG. 5 is a flowchart illustrating a processor assigning a task to an external device according to an embodiment of the present disclosure.

Referring to FIG. 5, in operation 510, the processor 110 determines an authorization level of an external device.

The processor 110 determines whether the external device has a preset authorization level and determines what the authorization level is when the external device has the preset authorization level. The external device is connected to a device including the processor 110. If the external device has no preset authorization level, the processor 110 may set the authorization level of the external device as a default value.

In operation 520, the processor 110 determines whether to assign a task according to the authorization level.

The processor 110 may separately determine an external device to perform a task requiring data generated in association with the operation of the vehicle 100 and an external device to perform a task not requiring the data, depending on the authorization levels set to the external devices.

In operation 530, the processor 110 assigns a task to an external device.

The processor 110 assigns a task to the external device determined in operation 520.

An example in which the processor 110 determines an authorization level of an external device will be described with reference to FIG. 6.

Figure 6:
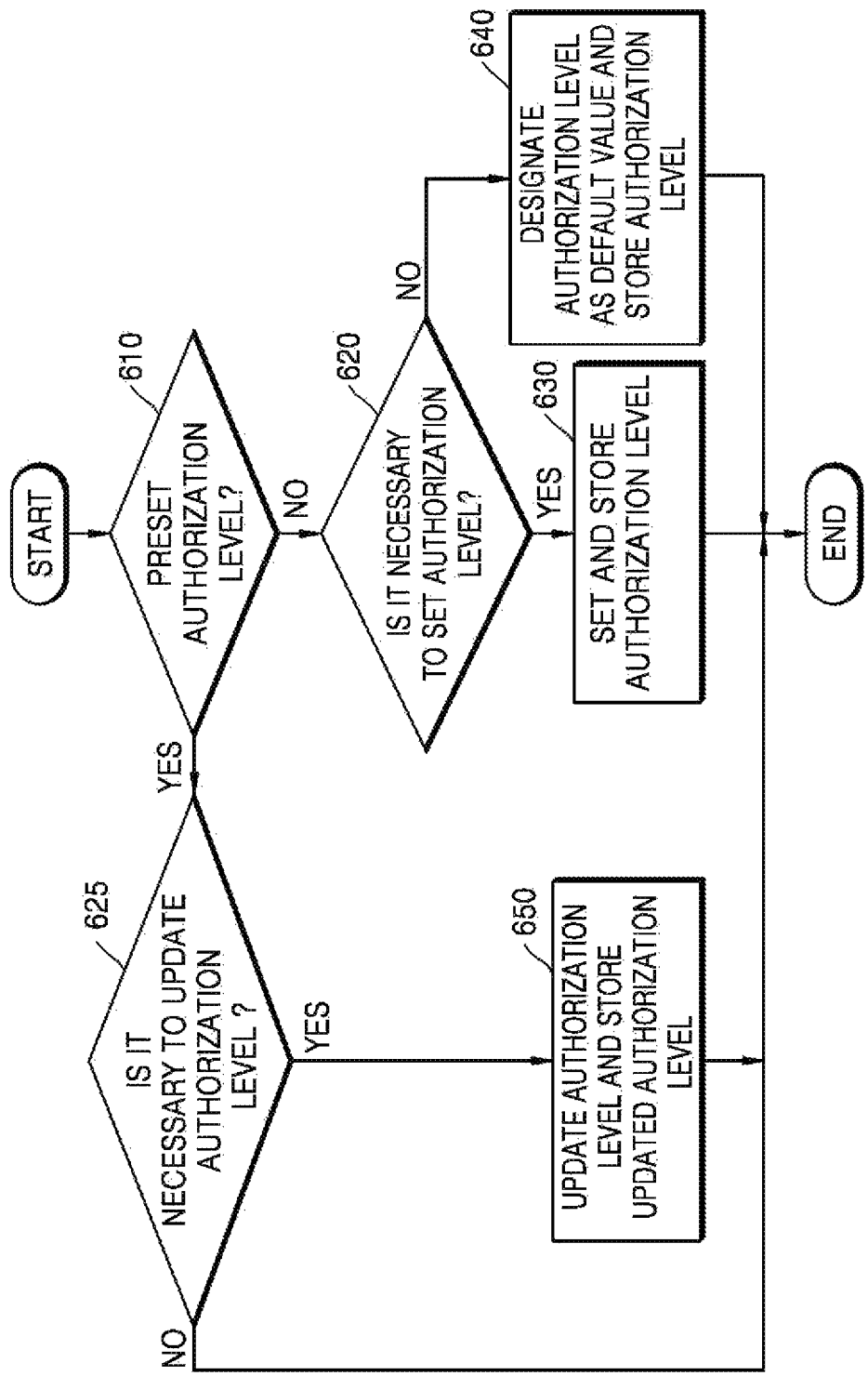
FIG. 6 is a flowchart illustrating a processor determining an authorization level of an external device according to an embodiment of the present disclosure.

FIG. 6 is a flowchart illustrating a processor determining an authorization level of an external device according to an embodiment of the present disclosure.

Referring to FIG. 6, in operation 610, the processor 110 determines whether an external device has a preset authorization level. The external device is connected to a device including the processor 110. When the external device has no preset authorization level, the processor 110 proceeds to operation 620, and when it is necessary to update the authorization level set to the external device, the processor 110 proceeds to operation 625. In other words, when the external device has the preset authorization level, the processor 110 determines whether to request the execution of the task based on the authorization level.

In operation 620, the processor 110 determines whether it is necessary to set an authorization level to an external device. When it is necessary to set the authorization level to the external device, the processor 110 proceeds to operation 630, and when it is unnecessary to set the authorization level to the external device, the processor 110 proceeds to operation 640.

In operation 625, the processor 110 determines whether it is necessary to update the authorization level preset to the external device. When it is necessary to update the authorization level of the external device, the processor 110 proceeds to operation 650, and when it is unnecessary to update the authorization level of the external device, the processor 110 ends the procedure.

In operation 630, the processor 110 sets the authorization level to the external device and stores information about the set authorization level. For example, the processor 110 may request the memory to store the information about the authorization level set to the external device.

In operation 640, the processor 110 designates the authorization level of the external device as a default value and stores information about the designated authorization level. The default value may be preset by a designer of the processor 110, or may be changed by a user.

In operation 650, the processor 110 updates the authorization level of the external device and stores information about the updated authorization level.

An example in which the processor 110 sets an authorization level of an external device will be described with reference to FIG. 7.

Figure 7:
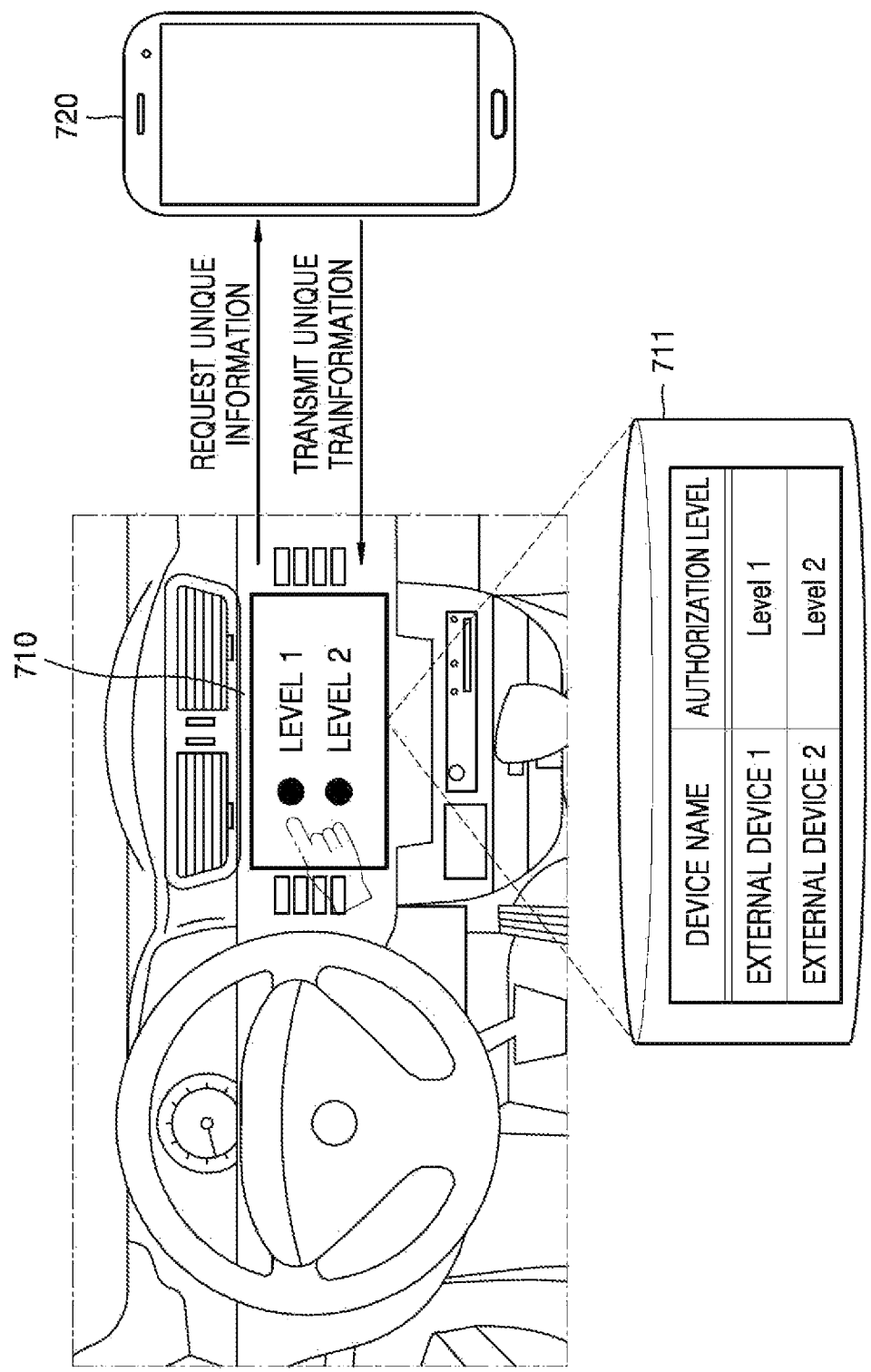
FIG. 7 is a diagram illustrating a processor setting an authorization level of an external device according to an embodiment of the present disclosure.

FIG. 7 is a flowchart illustrating a processor setting an authorization level of an external device according to an embodiment of the present disclosure.

Referring to FIG. 7, a device 710 including the processor 110 and an external device 720 connected to the device 710 are illustrated.

When the external device 720 has no preset authorization level, or when it is necessary to update the preset authorization level, the processor 110 sets the authorization level of the external device 720.

First, the processor 110 may undergo an authentication procedure with respect to the external device 720. Specifically, the processor 110 may perform an authentication procedure on the external device 720 by receiving unique information of the external device 720 from the external device 720. As one example, the processor 110 may authenticate the external device 720 by requesting the external device 720 for unique information and receiving the unique information from the external device 720. As another example, the processor 110 may authenticate the external device 720 by receiving unique information from the external device 720 and approving the received unique information. The unique information may be international mobile equipment identity (IMEI) of the external device 720, but embodiments of the present disclosure are not limited thereto.

When the external device 720 is authenticated, the processor 110 sets the authorization level of the external device 720 according to a user's selection. For example, the processor 110 may output a list of authorization levels on a screen of the device 710, so that the authorization level of the external device 720 is set according to a user's selection from the output list of authorization levels.

In addition, the processor 110 may store information about the set authorization level. For example, the processor 110 may request a memory 711 of the device 710 to store the information about the authorization level. At this time, the processor 110 may request the memory 711 to map and store the information about the authorization level and the external device 720. Therefore, when the external device 720 is connected again to the vehicle 100 after the setting of the authorization level, the processor 110 may designate the authorization level of the external device 720 as a previously set authorization level.

On the other hand, the processor 110 may determine whether to request the external device 720 for unique information according to the authorization level set to the external device 720. For example, the processor 110 may request the external device 720 for unique information only when the authorization level of Level 1 is to be granted to the external device 720.

On the other hand, the processor 110 may receive, from the external device 720, information about available resources to be used for a task. An example in which the processor 110 receives information about available resources from an external device 820 will be described with reference to FIG. 8.

Figure 8:
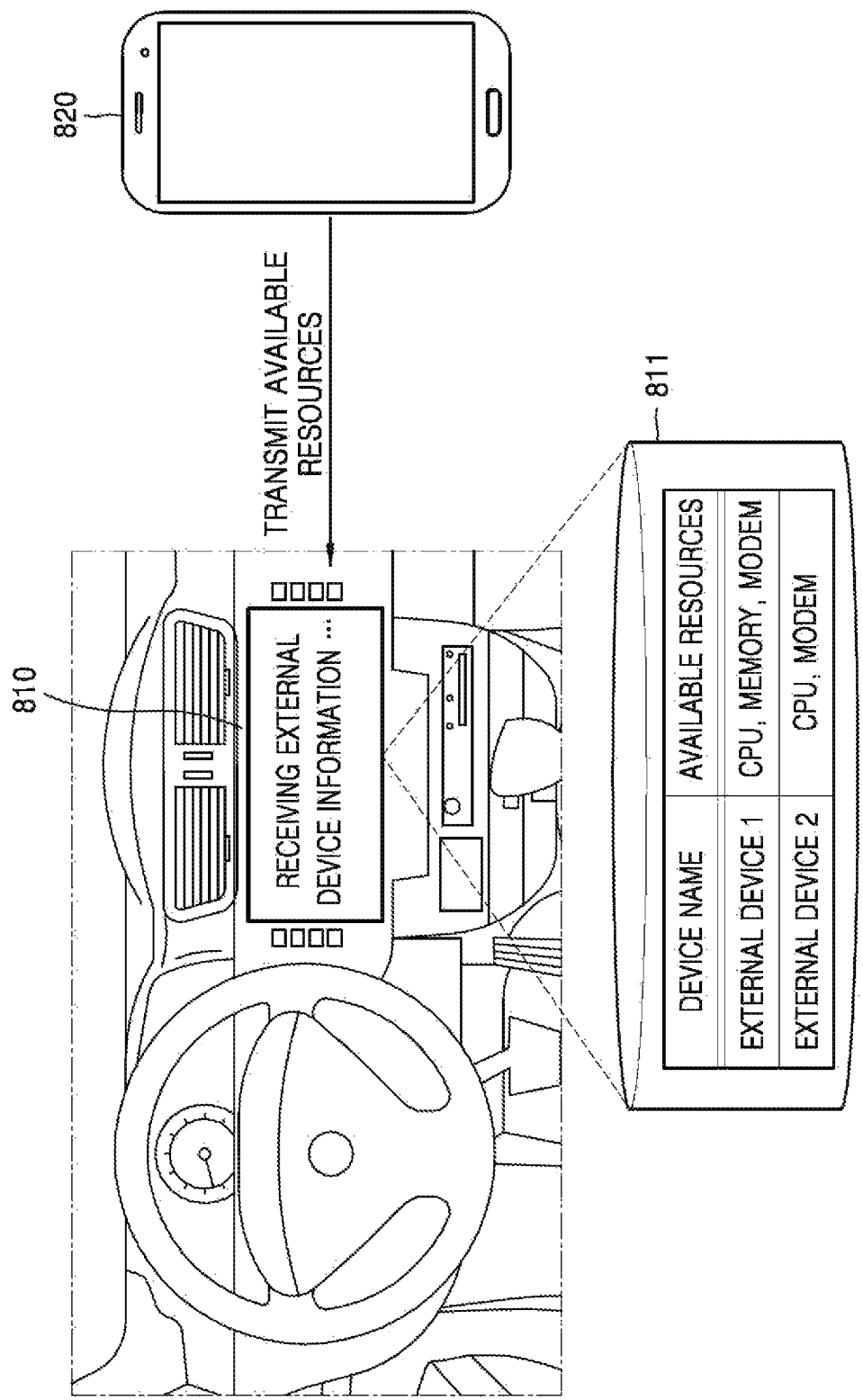
FIG. 8 is a diagram illustrating a processor receiving information about available resources from an external device according to an embodiment of the present disclosure.

FIG. 8 is a diagram illustrating a processor receiving information about available resources from an external device according to an embodiment of the present disclosure.

Referring to FIG. 8, a device 810 including the processor 110 and an external device 820 connected to the device 810 are illustrated.

Before or after the authorization level is set to the external device 820, the processor 110 receives information about available resources from the external device 820. The available resources can be used in executing a task assigned by the processor 110. For example, the available resources may correspond to a data processing speed, a data throughput, a data download speed, a data storage space, idle power, and the like.

For example, the processor 110 may request the external device 820 to transmit the information about the available resources, and the external device 820 may transmit the information about the available resources to the processor 110 by taking into account the specification about its own hardware and software and a current state of the external device 820. The current state of the external device 820 may denote available resources of the external device 820 that can be utilized for executing the task assigned by the processor 110. For example, when it is assumed that the total data storage space of the external device 820 is 100 GB and 30 GB of data is stored therein, the external device 820 may use 70 GB in executing the task assigned by the processor 110. In this case, even if the hardware specification of the external device 820 is 100 GB, the available resources of the external device 820 may be 70 GB when taking into account the current state of the external device 820.

At this time, the external device 820 may transmit only information about some resources of the external device 820 to the processor 110. In other words, the external device 820 may transmit information about entire hardware and software of the external device 820 to the processor 110, or may transmit information about partial hardware and software to the processor 110.

In addition, the processor 110 may store the information about the available resources of the external device 820. For example, the processor 110 may request a memory 811 of the device 810 to store the information about the available resources. At this time, the processor 110 may request the memory 811 to map and store the information about the available resources and the external device 820.

Figure 9:
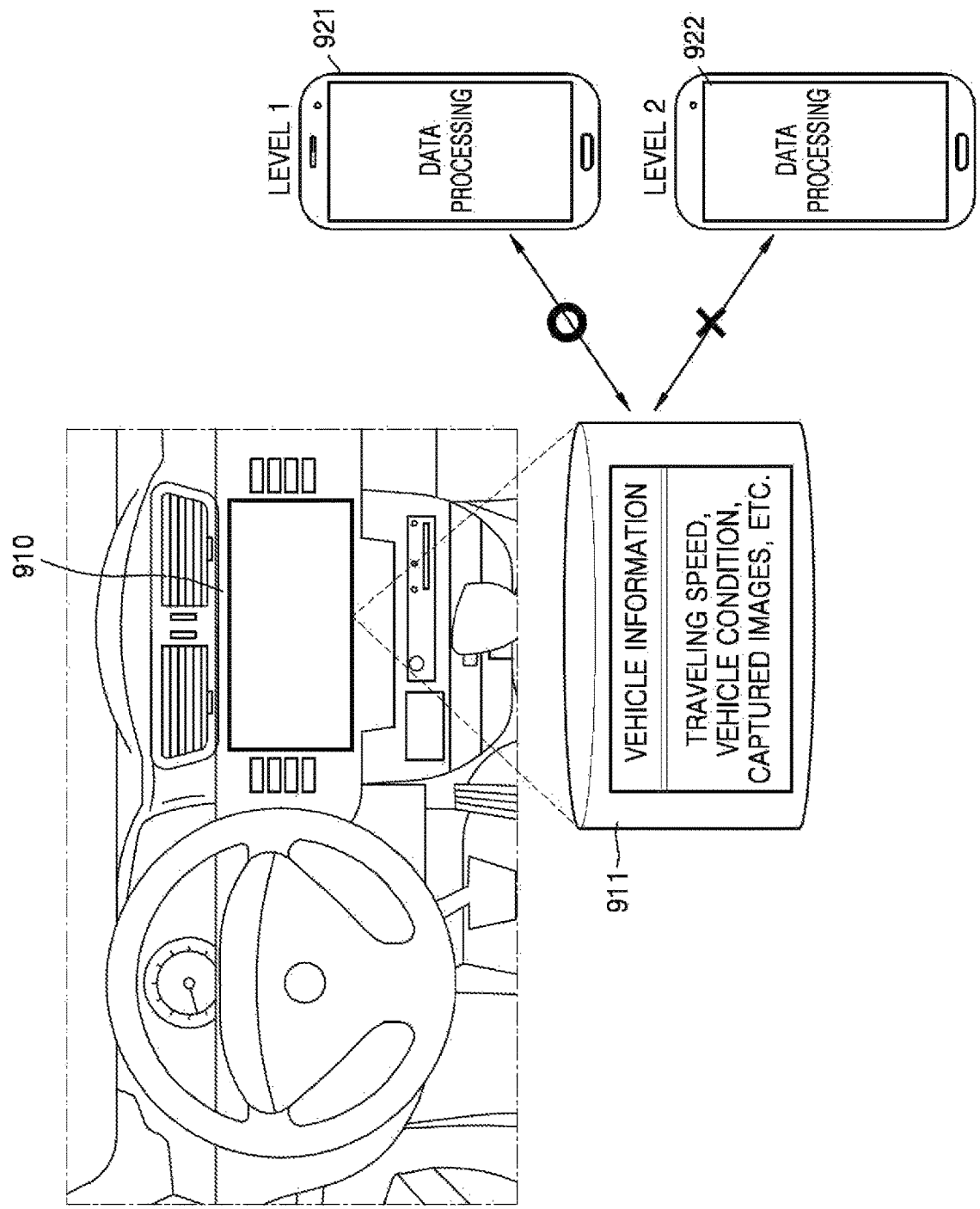
FIG. 9 is a diagram illustrating a memory storing data generated in association with an operation of a vehicle according to an embodiment of the present disclosure.

FIG. 9 is a diagram illustrating a memory storing data generated in association with an operation of a vehicle according to an embodiment of the present disclosure.

Referring to FIG. 9, an example in which data is stored in a memory 911 of a device 910 is illustrated. The memory 911 may store data generated as the vehicle 100 performs an operation. For example, while the vehicle 100 is traveling, the memory 911 may store a speed or a revolution per minute (RPM) of the vehicle 100. In addition, the memory 911 may store information about a location of the vehicle 100, information about a size of the vehicle 100 (for example, a width, a height, or the like of the vehicle 100), an operation of an event generated in the vehicle 100 (for example, an operation of a warning light, an operation of an anti-lock brake system (ABS), identification of a dangerous object, braking to a predetermined degree or more, puncture of a wheel of the vehicle 100, or the like), information about a traveling route of the vehicle 100 (for example, information about a location of the vehicle 100 by time), a state of a wiper of the vehicle 100, unique information of the vehicle 100 (for example, a model of the vehicle 100, a code of an owner, or the like), and the like. In addition, the memory 911 may store information about internal temperature or humidity of the vehicle 100. In addition, the memory 911 may store image signals generated by the camera of the vehicle 100, and may store programs necessary for driving various devices installed in the vehicle 100. In addition, the memory 911 may store a variety of content downloaded from the outside. The data stored in the memory 911 is not limited to the above-mentioned data, and any data may be stored in the memory 911 as long as the data is generated as the vehicle 100 performs various operations.

On the other hand, the external devices 921 and 922 may or may not be able to access the information generated while the vehicle 100 is traveling among pieces of data stored in the memory 911, depending on what the set authorization level is. For example, when it is assumed that the authorization level of the external device 921 is Level 1, the external devices 921 may be able to access the information generated while the vehicle 100 is traveling among pieces of data stored in the memory 911 when executing the task. On the other hand, when it is assumed that the authorization level of the external device 922 is Level 2, the external devices 922 may be limited to access the information generated while the vehicle 100 is traveling among pieces of data stored in the memory 911 when executing the task.

The processor 110 may assign a task to the external device by further taking into account the available resources of the external device as well as the authorization level of the external device. Examples in which the processor 110 assigns tasks to external devices will be described with reference to FIGS. 10, 11, and 12.

Figure 10:
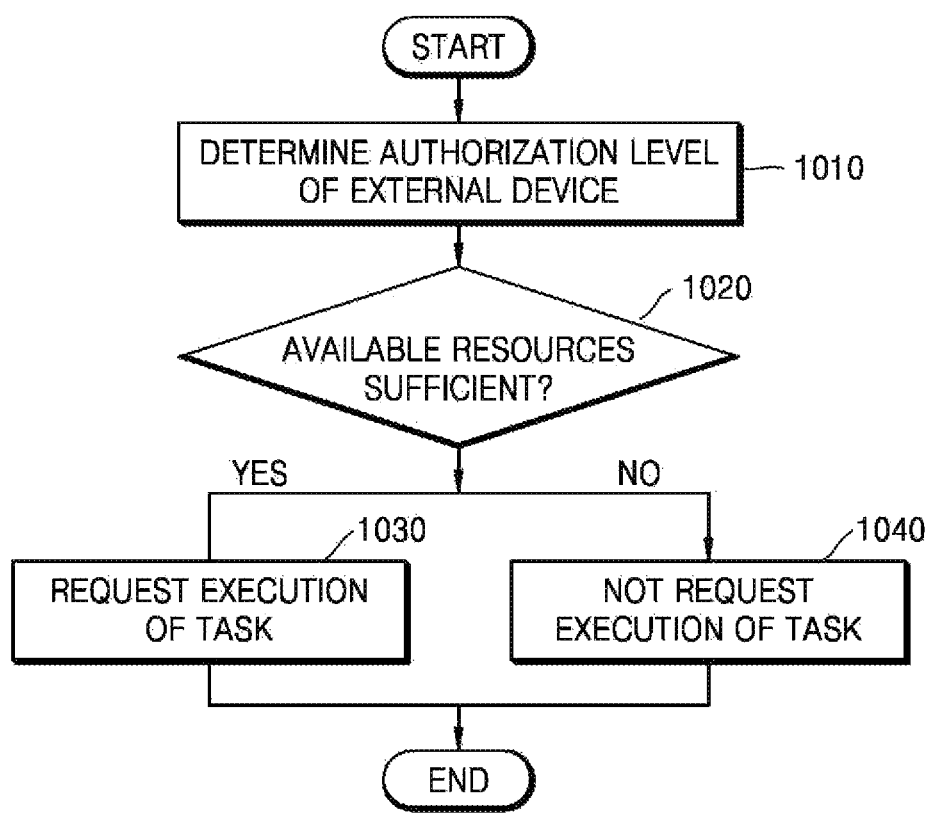
FIG. 10 is a flowchart illustrating a processor assigning a task to an external device by taking into account an authorization level and available resources of the external device according to an embodiment of the present disclosure.

FIG. 10 is a flowchart illustrating a processor assigning a task to an external device by taking into account an authorization level and available resources of an external device according to an embodiment of the present disclosure.

Referring to FIG. 10, in operation 1010, the processor 110 determines an authorization level of an external device. For example, the processor 110 determines whether the authorization level of the external device is an authorization level capable of executing a task to be requested. When the authorization level of the external device is an authorization level unsuitable for executing the task, the processor 110 may not request the external device to execute the task.

In operation 1020, the processor 110 determines whether available resources of the external device are sufficient. In other words, the processor 110 determines whether the external device secures sufficient available resources to execute the task to be requested. When the available resources of the external device are sufficient, the processor 110 proceeds to operation 1030, and when the available resources of the external device are not sufficient, the processor 110 proceeds to operation 1040.

In operation 1030, the processor 110 assigns a task to the external device. In operation 1040, the processor 110 does not assign a task to the external device.

As described with reference to FIG. 10, the processor 110 may take into account whether the available resources of the external device are sufficient, before assigning the task to the external device. However, embodiments of the present disclosure are not limited thereto. In other words, the processor 110 may continuously determine whether the available resources of the external device are sufficient to execute the remaining task, even when the external device is performing the task. When the available resources of the external device that is executing the task are insufficient to execute the remaining tasks, the processor 110 may cancel the request to execute the remaining tasks.

On the other hand, when there are a plurality of external devices capable of executing tasks, the processor 110 may determine an order of the external devices. The order describes a priority order in which the processor 110 requests the execution of the task. Examples in which the processor 110 determines the order of external devices and assigns tasks to the external devices according to the determined order will be described with reference to FIGS. 11 and 12.

Figure 11:
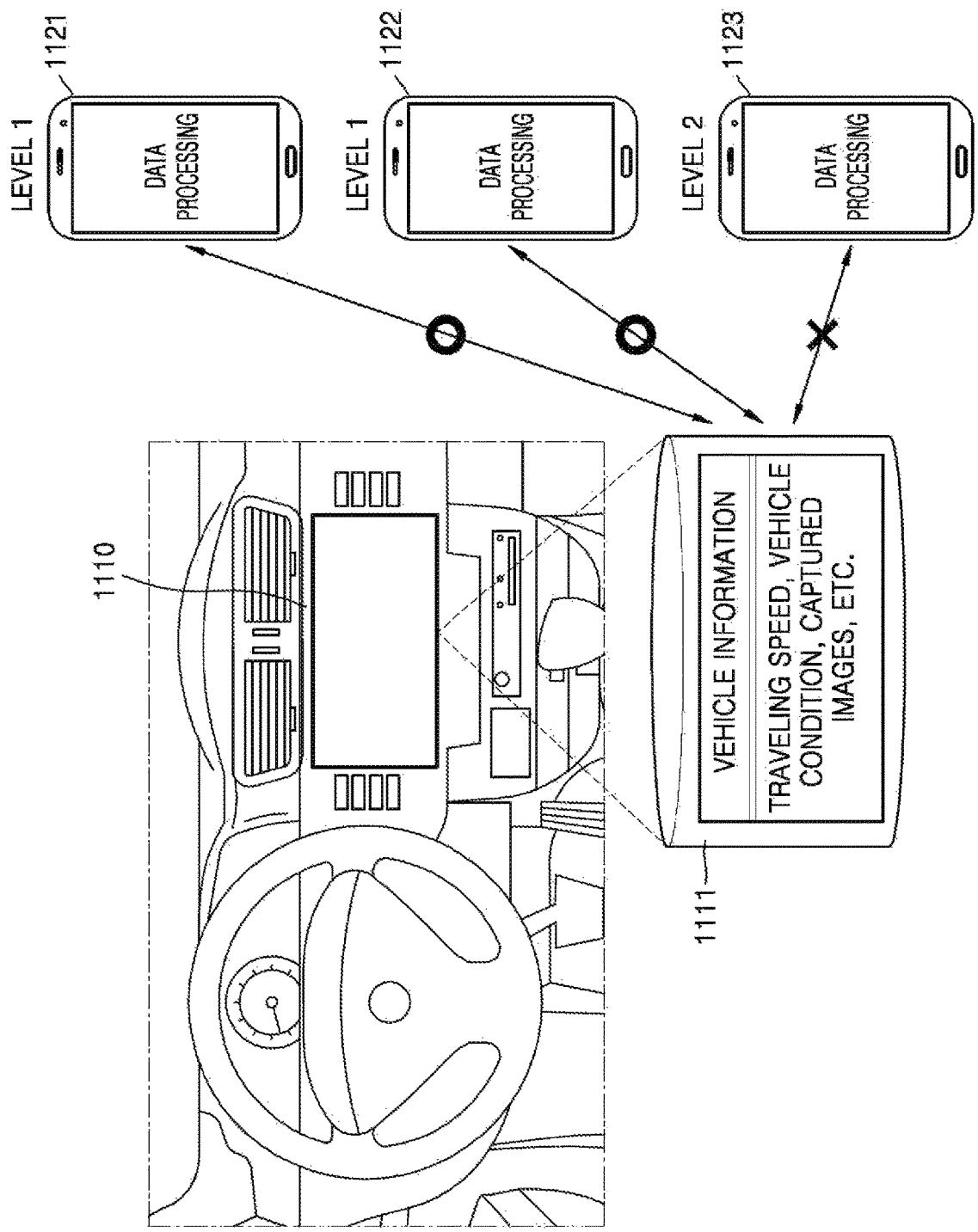
FIG. 11 is a diagram illustrating a processor determining an order of external devices according to an embodiment of the present disclosure.

FIG. 11 is a diagram illustrating a processor determining an order of external devices according to an embodiment of the present disclosure.

Referring to FIG. 11, an example in which a device 1110 including the processor 110 and external devices 1121, 1122, and 1123 are connected to each other are illustrated. It is assumed that the authorization levels of the external devices 1121 and 1122 are set to Level 1, and the authorization level of the external device 1123 is set to Level 2. In addition, it is assumed that the task is a task that is executed by using information generated while the vehicle is traveling among pieces of data stored in a memory 1111 of the device 1110.

The processor 110 may assign tasks to the external devices 1121 and 1122. At this time, the processor 110 may determine to which external device a priority to a task request is given, by taking into account the available resources of each of the external devices 1121 and 1122.

For example, when the data processing speed of the external device 1121 is faster than the data processing speed of the external device 1122, the processor 110 may preferentially assign the task to the external device 1121 rather than the external device 1122. In this case, the order of the external device 1121 takes priority over the order of the external device 1122.

On the other hand, the order of the external devices 1121 and 1122 may be differently determined according to the type of the task. For example, when the data storage capacity of the external device 1122 is larger than the data storage capacity of the external device 1121 and a large amount of data has to be stored at the time of executing the task, the processor 110 may determine the order of the external devices 1121 and 1122 so that the order of the external device 1122 takes priority over the order of the external device 1121.

When the order of the external devices 1121 and 1122 is determined, the processor 110 assigns tasks to the external devices 1121 and 1122 according to the determined order. During the execution of the task, the processor 110 may change a task execution subject. For example, the processor 110 may assign the remaining task to the external device 1122 even when the external device 1121 is executing the task. An example in which the processor 110 changes a task execution subject will be described with reference to FIG. 12.

Figure 12:
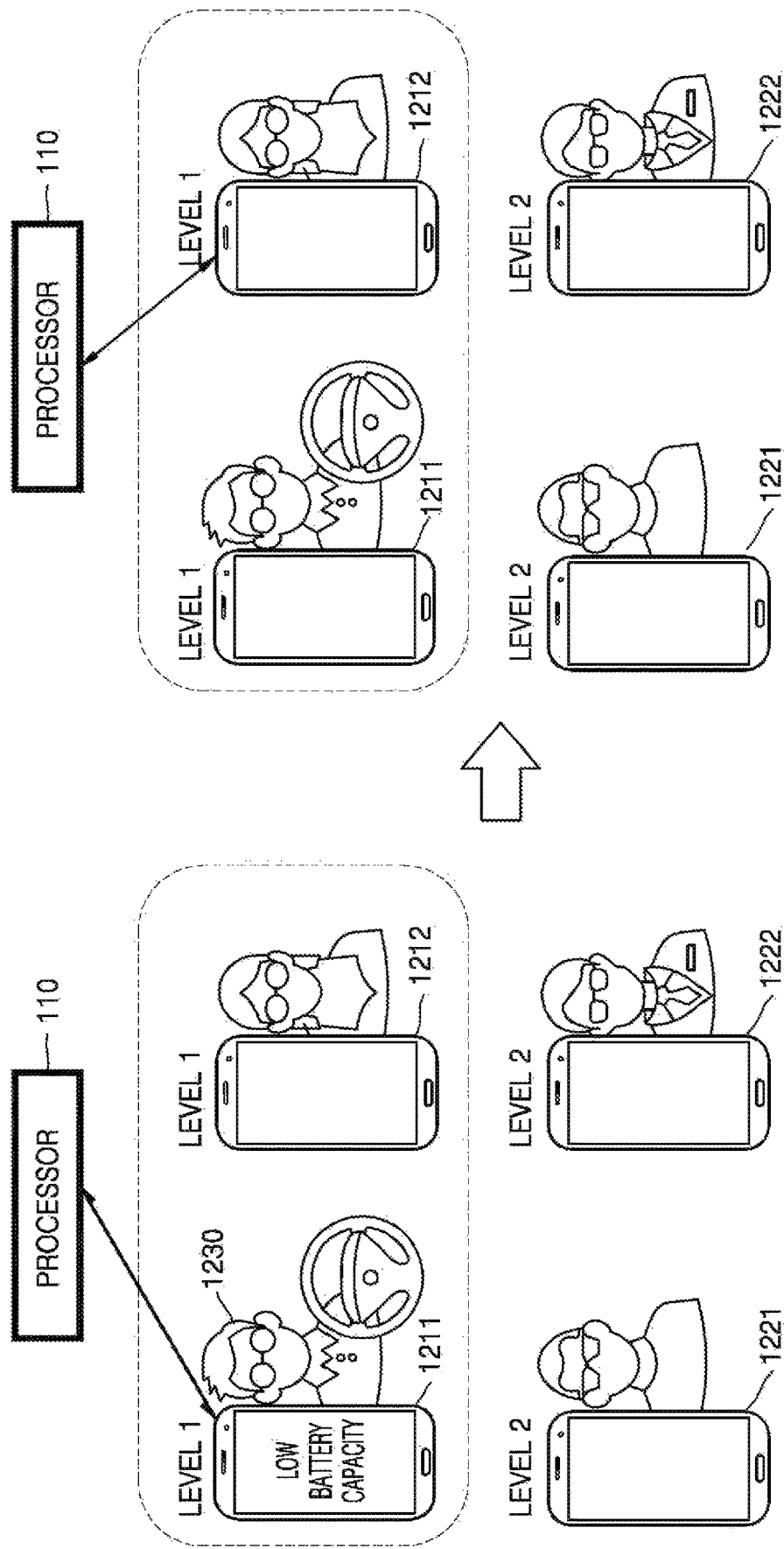
FIG. 12 is a diagram illustrating a processor changing a task execution subject according to the order of external devices according to an embodiment of the present disclosure.

FIG. 12 is a diagram illustrating a processor changing a task execution subject according to an order of external devices according to an embodiment of the present disclosure.

Referring to FIG. 12, external devices 1211 and 1212 are determined as Level 1, and external devices 1221 and 1222 are determined as Level 2. In addition, it is assumed that the task is a task that can be executed only by the external devices 1211 and 1212 of Level 1, and the external devices 1211 and 1212 are respectively determined as ranking 1 and ranking 2.

The processor 110 may request the external device 1211 to execute the task, and the external device 1211 may execute the task by using its own available resources. During the execution of the task, the available resources of the external device 1211 may be consumed for various reasons. As one example, idle power of the external device 1211 may be reduced due to the execution of the task, and thus, the external device 1211 may no more execute the task. As another example, the user may use the external device 1211 for another purpose during the execution of the task, and thus, the resources of the external device 1211 for executing the task requested by the processor 110 may be lost.

The processor 110 may continuously determine the change in the available resources of the external device 1211 and determine whether the external device 1211 is capable of continuously executing the task. When the processor 110 determines that the external device 1211 is not capable of executing the task any more, the processor 110 may request the external device 1212 to execute the other tasks.

In addition, the processor 110 may divide a task and assign the divided task to the external devices 1211 and 1212. For example, the processor 110 may request the external device 1211 to execute ⅔ of the task and request the external device 1212 to execute ⅓ of the task. For example, the processor 110 may determine a ratio of the task to be requested to the external devices 1211 and 1212 according to the available resources of the external devices 1211 and 1212 and/or the type of the task.

On the other hand, the tasks that are executable for each authorization level may be mapped and stored in the device including the processor 110. Hereinafter, an example in which an authorization level and a task are mapped and stored in a device will be described with reference to FIG. 13.

Figure 13:
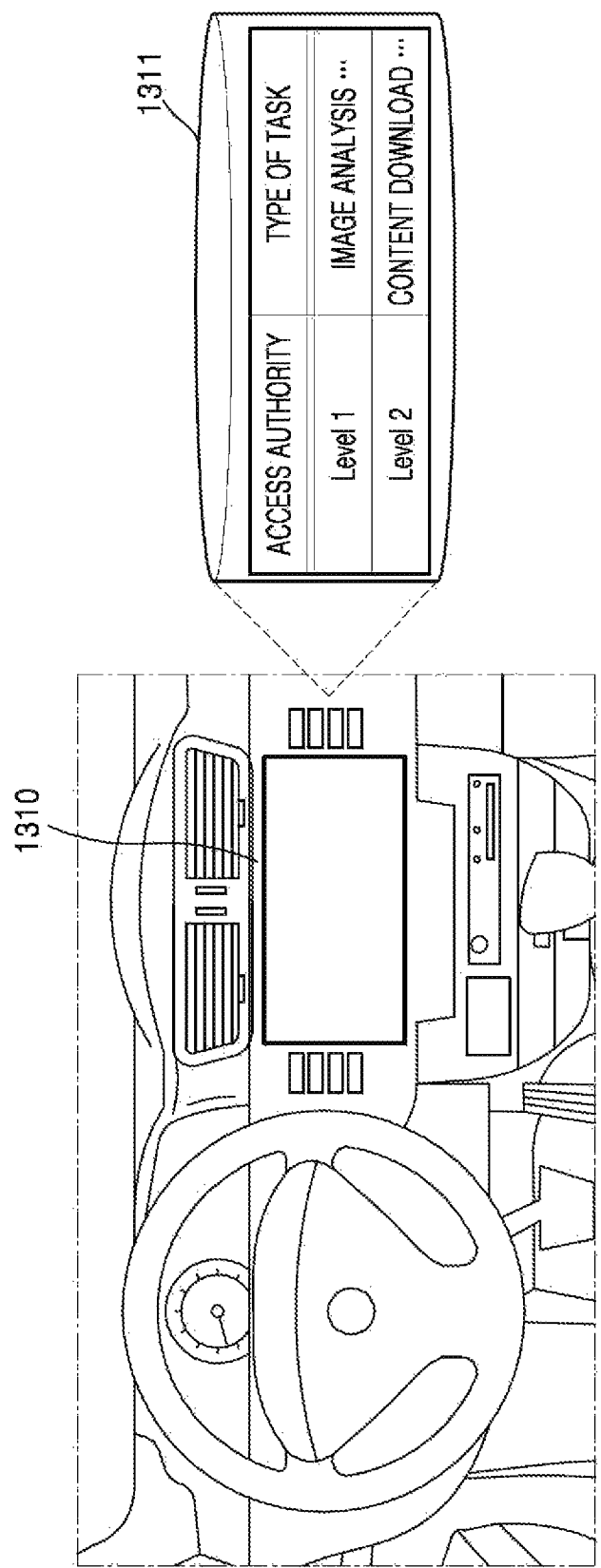
FIG. 13 is a diagram illustrating an authorization level and a task being mapped and stored according to an embodiment of the present disclosure.

FIG. 13 is a diagram illustrating an authorization level and a task being mapped and stored according to an embodiment of the present disclosure.

Referring to FIG. 13, an example of data stored in a memory 1311 of a device 1310 is illustrated. For example, tasks that are executable by external devices of Level 1 and tasks that are executable by external devices of Level 2 may be separately stored in the memory 1311. The task separation criteria may be whether it is necessary to use information generated while the vehicle is traveling among pieces of data stored in the memory 1311 in executing the task.

For example, tasks, such as image generation, image analysis, image processing, and the like, may be classified as tasks that are executable by the external devices of Level 1. Specifically, image signals generated by the camera of the vehicle 100 may be stored in the memory 1311. In this case, it is necessary to use the image signals stored in the memory 1311 so as to generate an image. Therefore, the processor 110 may provide the image signals to only an external device having an authorization level of Level 1, or may allow the external device to read the image signals from the memory 1311.

As another example, tasks, such as content download may be classified as tasks that are executable by the external devices of Level 2. The content download is only required to download content and transmit the downloaded content to the device 1310, without accessing the information generated while the vehicle is traveling among pieces of data stored in the memory 1311. Therefore, the processor 110 may preset the external device having an authorization level of Level 2 to execute the content download task.

On the other hand, the task corresponding to Level 2 may be preset to be also executed by the external device having an authorization level of Level 1.

Figure 14:
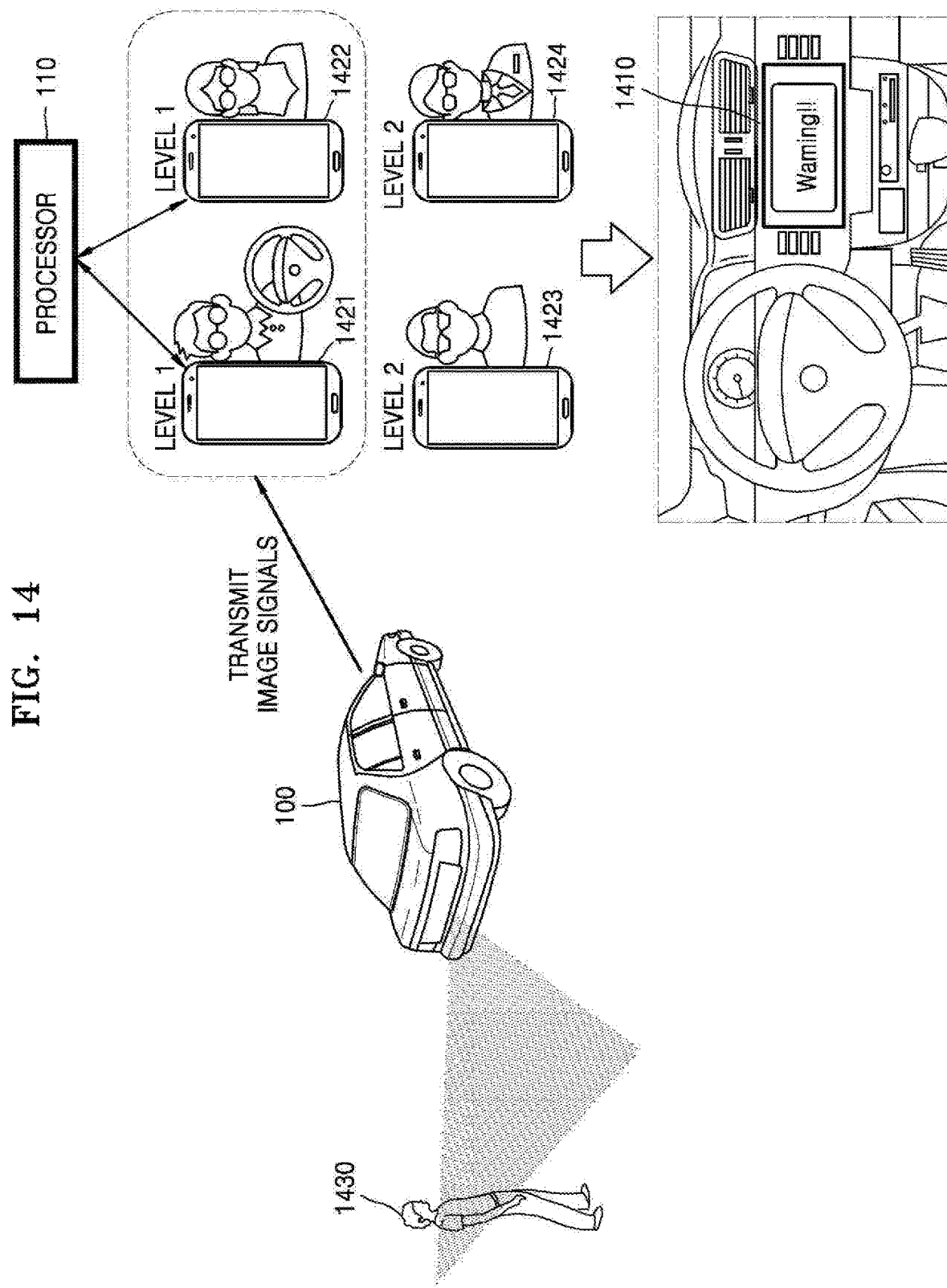
FIG. 14 is a diagram illustrating a processor outputting an image captured by a camera of a vehicle according to an embodiment of the present disclosure.

FIG. 14 is a diagram illustrating a processor outputting images generated by external devices according to an embodiment of the present disclosure.

Referring to FIG. 14, an example in which the vehicle 100 moves backward is illustrated. A camera of a vehicle 100 may photograph a rear region of the vehicle 100 and generate image signals. The image signals denote data generated by the camera. The generated image signals may be stored in the memory of the vehicle 100.

The processor 110 selects external devices 1421 and 1422 that are to generate images among external devices 1421, 1422, 1423, and 1424 connected to a device 1410. For example, when it is assumed that the authorization levels of the external devices 1421 and 1422 are Level 1 and the authorization levels of the external devices 1423 and 1424 are Level 2, the processor 110 may request the external devices 1421 and 1422 to execute the image generation task by taking into account the authorization levels of the external devices 1421, 1422, 1423, and 1424. In addition, the processor 110 may select external devices to be requested for the task by taking into account available resources of the external devices 1421, 1422, 1423, and 1424, and may determine the order of the external devices 1421 and 1422. In addition, the processor 110 may change the task execution subject from the external device 1421 to the external device 1422.

On the other hand, the external devices 1421 and 1422 may not only generate images but also analyze the images and provide a variety of information to the processor 110. For example, the external devices 1421 and 1422 may analyze change information of the images and confirm that an obstacle 1430 approaches the rear of the vehicle 100. In this case, the external devices 1421 and 1422 may notify the processor 110 that the obstacle 1430 is approaching, and the processor 110 may output a warning notification through the device 1410. The warning notification may be an image notification output through a screen of the device 1410, or may be a sound notification output through a speaker of the device 1410.

Figure 15:
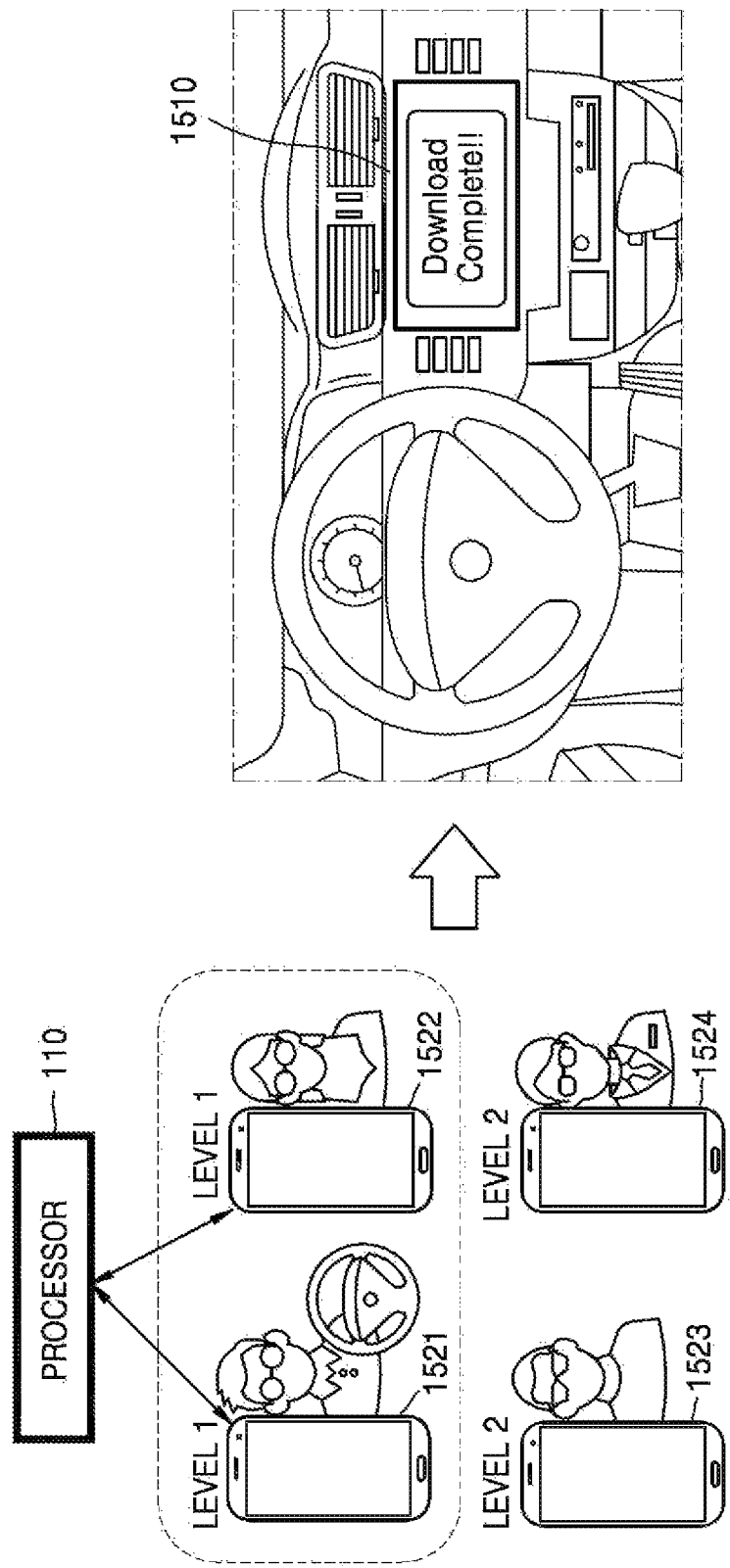
FIG. 15 is a diagram illustrating a processor outputting content downloaded by external devices according to an embodiment of the present disclosure.

FIG. 15 is a diagram illustrating a processor outputting content downloaded by external devices according to an embodiment of the present disclosure.

Referring to FIG. 15, an example in which a device 1510 including the processor 110 being connected to external devices 1521, 1522, 1523, and 1524 is illustrated. The device 1510 may output downloaded content, and the processor 110 may request the external devices 1521, 1522, 1523, and 1524 to execute a content download task. As one example, the content may be music, still images, or moving images, which can be output through the device 1510. As another example, the content may be a map showing roads and regions. The processor 110 may select external devices to be requested for the task by taking into account authorization levels and/or available resources of the external devices 1521, 1522, 1523, and 1524, and may determine the order of the external devices 1521, 1522, 1523, and 1524. In addition, the processor 110 may change the task execution subject from the external device 1521 to the external device 1523.

The processor 110 may receive the content from the external devices 1521, 1522, 1523, and 1524 and reproduce the content through the device 1510.

In addition, the processor 110 may request the external devices 1521, 1522, 1523, and 1524 to execute voice recognition and perform an operation corresponding to recognized voice. For example, the processor 110 may request the external device 1521 to analyze a voice uttered by a passenger, receive an analysis result from the external device 1521, and perform an operation corresponding to the voice. For example, when the passenger says "Play music", the processor 110 may receive a voice analysis result from the external device 1512 and reproduce music through the device 1510. If the external device 1512 fails to analyze the voice, the processor 110 may request at least one of the other external devices 1522, 1523, and 1524 to analyze the voice.

The processor 110 may determine whether a malicious program has been installed on the external devices 1521, 1522, 1523, and 1524, and may not request the external devices, on which the malicious program has been installed, to execute the tasks. For example, even though the external devices 1521, 1522, 1523, and 1524 are all capable of executing the tasks, if a malicious program has been installed on the external device 1524, the processor 110 may not request the external device 1524 to execute the task.

Figure 16:
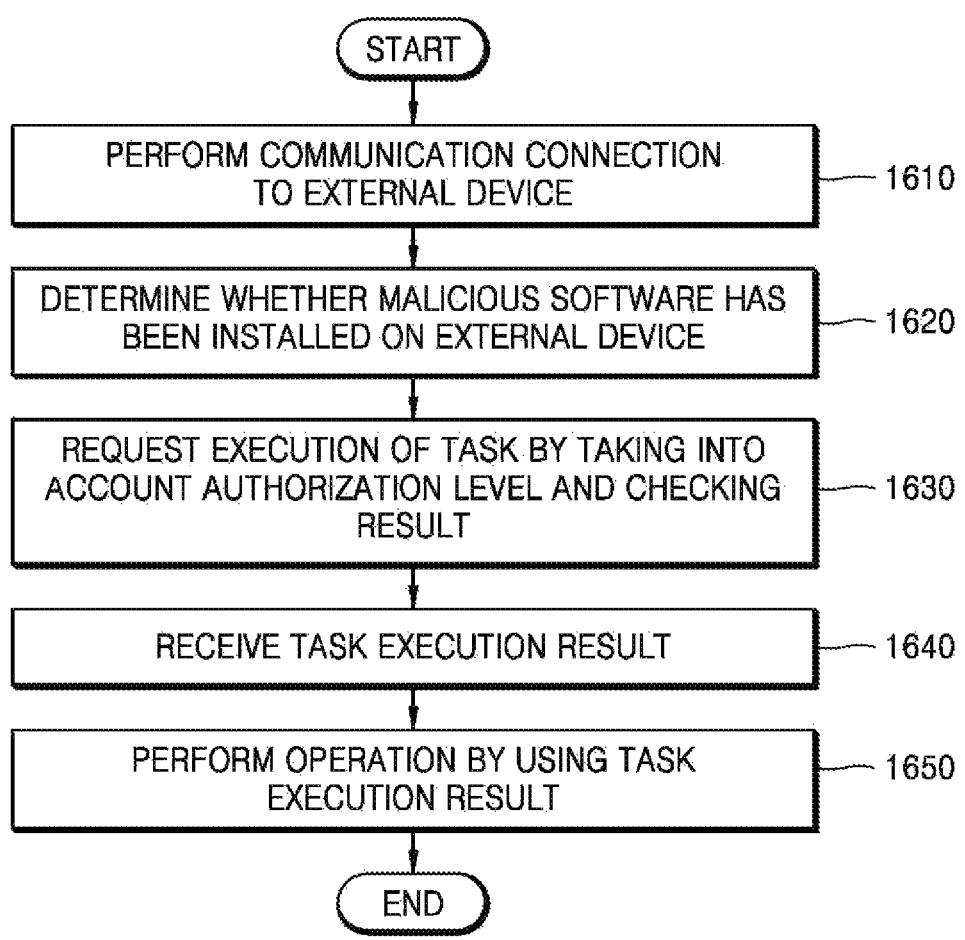
FIG. 16 is a flowchart of a method by which a processor requests at least one external device to execute a task according to an embodiment of the present disclosure.

FIG. 16 is a flowchart of a method by which a processor requests at least one external device to execute a task according to an embodiment of the present disclosure.

Referring to FIG. 16, in operation 1610, the processor 110 performs communication connection to the external device.

For example, the processor 110 may be connected to the external device via a wireless communication scheme or a wired communication scheme. In addition, when there are a plurality of external devices that are connectable to the processor 110, the processor 110 may select external devices to be connected from among the plurality of external devices.

In operation 1620, the processor 110 determines whether malicious software has been installed on the external devices. For example, the processor 110 may determine whether malicious software has been installed on the external devices by analyzing codes of programs installed on the external devices or by using the installed program.

In operation 1630, the processor 110 requests the execution of the task by taking into account the authorization levels of the external devices and a result of the determining. For example, the processor 110 selects an external device, on which malicious software has not been installed, from among the connected external devices. The processor 110 may determine whether to execute the task by taking into account the authorization level of the selected external device. In addition, as described above, the processor 110 may determine whether to request the external device to execute the task by taking into account available resources of the external device.

In operation 1640, the processor 110 receives a task execution result from the external device. In operation 1650, the processor 110 performs an operation by using the task execution result.

Figure 17:
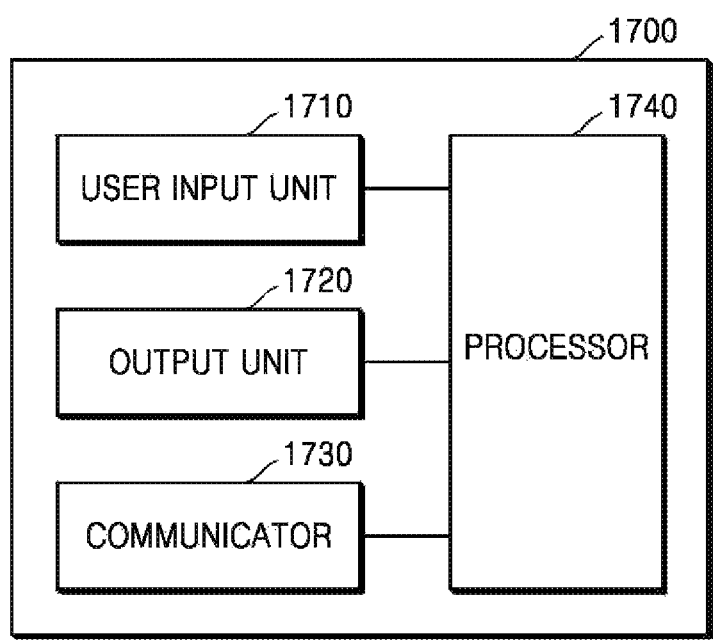
FIGS. 17 and 18 are block diagrams illustrating an external device according to an embodiment of the present disclosure.
Figure 18:
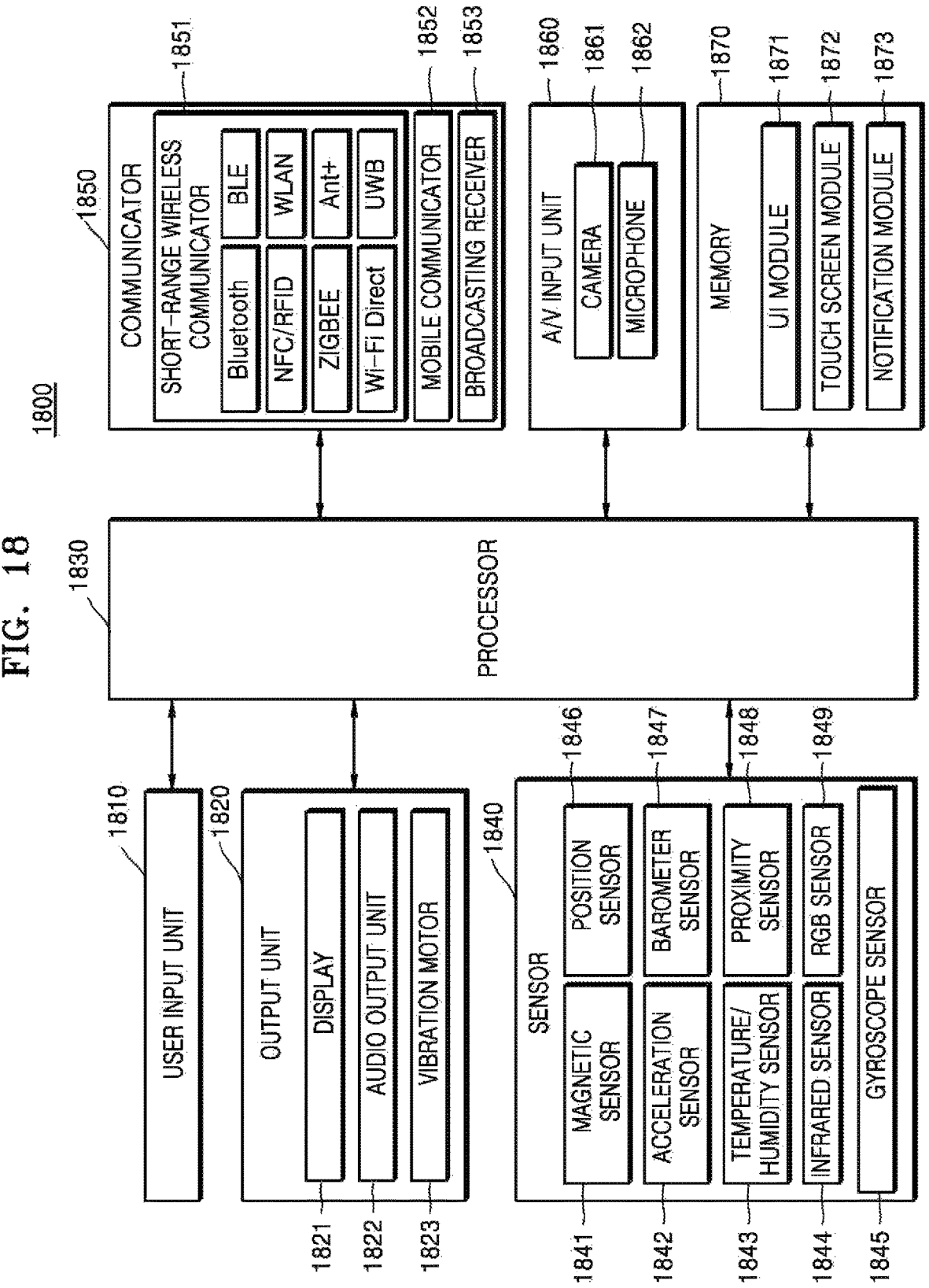

FIGS. 17 and 18 are block diagrams illustrating an external device according to an embodiment of the present disclosure.

Referring to FIG. 17, an external device 1700 may include a user input unit 1710, an output unit 1720, a processor 1740, and a communicator 1730. However, all elements illustrated in FIG. 17 are not essential to the external device 1700. The external device 1700 may be implemented by more elements than those illustrated in FIG. 17, or may be implemented by fewer elements than those illustrated in FIG. 17.

Referring to FIG. 18, an external device 1800 may further include a sensor 1840, an A/V input unit 1860, and a memory 1870, in addition to the user input unit 1810, the output unit 1820, the processor 1830, and the communicator 1850.

The user input unit 1810 may be a unit that allows the user to input data for controlling the external device 1800. For example, the user input unit 1810 may include a key pad, a dome switch, a touch pad (a touch-type capacitive touch pad, a pressure-type resistive touch pad, an infrared beam detection type touch pad, a surface acoustic wave type touch pad, an integral strain gauge type touch pad, a piezo effect type touch pad, or the like), a jog wheel, and a jog switch, but embodiments of the present disclosure are not limited thereto.

The user input unit 1810 may request a response message to a user's voice input and receive a user input for performing an operation related to the response message.

The output unit 1820 may output an audio signal, a video signal, or a vibration signal. The output unit 1820 may include a display 1821, an audio output unit 1822, and a vibration motor 1823.

The display 1821 may display information processed by the external device 1800. For example, the display 1821 may display a user interface (UI) for requesting the response message to the user's voice input and performing the operation related to the response message.

The audio output unit 1822 outputs audio data that is received from the communicator 1850 or is stored in the memory 1870. In addition, the audio output unit 1822 may output an audio signal related to the functions performed by the external device 1800 (for example, a call signal reception sound, a message reception sound, and a notification sound).

The processor 1830 may control an overall operation of the external device 1800. For example, the processor 1830 may control overall operations of the user input unit 1810, the output unit 1820, the sensor 1840, the communicator 1850, and the A/V input unit 1860 by executing programs stored in the memory 1870. In addition, the processor 1830 may execute the functions of the external device 1800 described with reference to FIGS. 1, 2, 3, 4, 5, 6, 7, 8, 9, 10, 11, 12, 13, 14, 15, 16, and 17 by executing programs stored in the memory 1870.

The sensor 1840 may detect a state of the external device 1800 or a state around the external device 1800 and transfer the detected information to the processor 1830. The sensor 1840 may be used to generate a part of context information indicating an ambient situation of the user or the external device 1800.

The sensor 1840 may include at least one selected from among a magnetic sensor 1841, an acceleration sensor 1842, a temperature/humidity sensor 1843, an infrared sensor 1844, a gyroscope sensor 1845, a position sensor (e.g., global positioning system (GPS)) 1846, a barometer sensor 1847, a proximity sensor 1848, and a red, green, blue (RGB) sensor (illuminance sensor) 1849, but embodiments of the present disclosure are not limited thereto. Since the functions of the respective sensors may be intuitively inferred from their names, detailed descriptions thereof will be omitted.

The communicator 1850 may include one or more elements for communication between the external device 1800 and another device including a device of a vehicle 100 or between the external device 1800 and a server. Another device may be a computing device, such as the external device 1800, or a detection device, but embodiments of the present disclosure are not limited thereto. For example, the communicator 1850 may include a short-range wireless communicator 1851, a mobile communicator 1852, and a broadcasting receiver 1853.

The short-range wireless communicator 1851 may include a Bluetooth communicator, a Bluetooth low energy (BLE) communicator, a near field communicator, a wireless local access network (WLAN) Wireless Fidelity (Wi-Fi) communicator, a ZigBee communicator, an infrared data association (IrDA) communicator, a Wi-Fi direction (WFD) communicator, an ultra wideband (UWB) communicator, or an Ant+ communicator, but embodiments of the present disclosure are not limited thereto.

The mobile communicator 1852 may transmit and receive a wireless signal with at least one selected from among a base station, an external terminal, and a server through a mobile communication network. The wireless signal may include a voice call signal, a video call signal, or various types of data according to transmission and reception of text and multimedia messages.

The broadcasting receiver 1853 may receive broadcasting signals and/or broadcasting-related information from the outside through a broadcasting channel. The broadcasting channel may include a satellite channel and a terrestrial channel. According to various embodiments of the present disclosure, the external device 1800 may not include the broadcasting receiver 1853.

In addition, the communicator 1850 may request a response message to a user's voice input and transmit and receive information necessary for performing an operation related to the response message to and from another device and the server.

The A/V input unit 1860 may receive audio or video signals and may include a camera 1861 and a microphone 1862. The camera 1861 may acquire an image frame, such as a still image or a moving image, through an image sensor in a video call mode or a photographing mode. An image captured by the image sensor may be processed by the processor 1830 or a separate image processor (not illustrated). The image captured by the camera 1610 may be utilized as context information of the user.

The microphone 1862 may receive external audio signals and process the external audio signals into electrical voice data. For example, the microphone 1862 may receive audio signals from the external device or the user. The microphone 1862 may receive a user voice input. The microphone 1862 may use various noise removal algorithms for removing noise generated in the process of receiving external audio signals.

The memory 1870 may store a program for processing and control of the processor 1830, and may store data input from the external device 1800 or output from the external device 1800.

The memory 1870 may include at least one storage medium selected from among flash memory, hard disk, multimedia card micro type memory, card type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, magnetic disk, and optical disk.

The programs stored in the memory 1870 may be classified into a plurality of modules according to functions thereof. For example, the programs may be classified into a UI module 1871, a touch screen module 1872, and a notification module 1873.

The UI module 1871 may provide a specialized UI or graphical user interface (GUI) that interworks with the external device 1800 according to applications. The touch screen module 1872 may detect a user's touch gesture on a touch screen and transmit information about the touch gesture to the processor 1830. According to an embodiment of the present disclosure, the touch screen module 1872 may recognize and analyze a touch code. The touch screen module 1872 may be implemented by separate hardware including a controller.

The notification module 1873 may generate a signal for notifying an event occurring in the external device 1800. Examples of the event occurring in the external device 1800 may include a call signal reception, a message reception, a key signal input, and a schedule notification. The notification module 1873 may output a notification signal through the display 1821 in the form of a video signal. The notification module 1873 may output a notification signal through the audio output unit 1822 in the form of an audio signal. The notification module 1873 may output a notification signal through a vibration motor 1823 in the form of a vibration signal.

Figure 19:
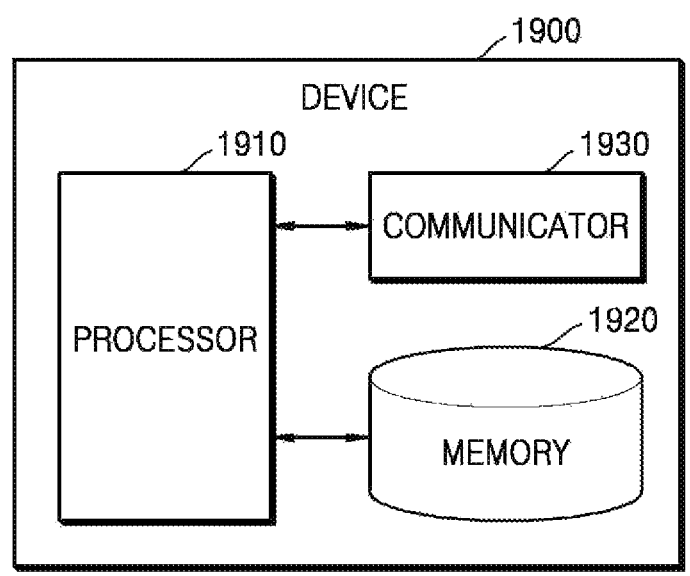
FIG. 19 is a block diagram illustrating a device including a process according to an embodiment of the present disclosure.

FIG. 19 is a block diagram of a device according to an embodiment of the present disclosure.

Referring to FIG. 19, a device 1900 includes a processor 1910, a memory 1920, and a communicator 1930.

The communicator 1930 may include one or more elements for communication with another device including the external device 1800.

The memory 1920 may store a program for processing and control of the processor 1910, and may store data input from the device 1900 or output from the device 1900. In addition, as described with reference to FIG. 18, a program stored in the memory 1920 may include a UI module, a touch screen module, and a notification module.

In addition, the memory 1920 may store data generated in association with the operation of the vehicle 100. In other words, the memory 1920 may store data generated as the vehicle 100 (or the device installed in the vehicle 100) operates.

The processor 1910 controls an overall operation of the device 1900. For example, the processor 1910 may control the overall operations of the memory 1920 and the communicator 1930 by executing programs stored in a memory 1920. The processor 1910 may perform the operation of the processor 110 described with reference to FIGS. 1, 2, 3, 4, 5, 6, 7, 8, 9, 10, 11, 12, 13, 14, 15, and 16 by executing programs stored in the memory 1920.

The processor 1910 may perform communication connection to the external device. The processor 1910 may determine an authorization level of the external device and determine an authorization level corresponding to a task according to characteristics of a plurality of tasks for performing the operation of the vehicle. The processor 1910 may assign a task to an external device corresponding to the authorization level.

The processor 1910 may determine the authorization level corresponding to the task according to whether information generated while the vehicle is traveling is required among pieces of data stored in the memory 1920 in executing the task. In addition, the processor 1910 may receive information about available resources from the external device and assign a task to the external device by taking into account the available resources.

When there are a plurality of external devices connected to the device 1900, the processor 1910 may select external devices, to which tasks are to be assigned, from among the external devices by taking into account the authorization levels of the connected external devices. In addition, the processor 1910 may determine the order of the external devices by taking into account the authorization levels of the external devices, and assign tasks to the external devices according to the determined order. In addition, the processor 1910 may determine the order of the external devices by taking into account the available resources of the external devices, and assign tasks to the external devices according to the determined order.

The processor 1910 may assign the task, which has been assigned to the external device, to another external device according to a change in the available resources of the external device. In addition, the processor 1910 may assign the task, which has been assigned to the external device, to another external device according to disconnection of the communication connection from the external device.

As described above, the processor 1910 may request the external device to execute the task according to the authorization level set to the external device and/or the available resources of the external device. Therefore, various operations desired by the user may be performed without regard to hardware or software capacity of the device including the processor.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a read-only memory (ROM), a random-access memory (RAM), compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Further, the method set forth above may be performed through execution of instructions included in at least one program stored in a computer-readable recording medium. When the instructions are executed by a computer, at least one computer may perform functions corresponding to the instructions. Examples of the instructions may include not only machine language codes created by a compiler but also high-level codes executable by a computer by using an interpreter. An example of the computer may be a processor, and an example of the recording medium may be a memory.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A vehicle operating apparatus comprising:
a memory configured to store information generated while a vehicle is traveling; and
a processor configured to:
perform a communication connection to a plurality of external devices in the vehicle,
identify a first authorization level of a first external device of the plurality of external devices,
determine a second authorization level corresponding to a task according to characteristics of the task for performing an operation of the vehicle,
identify that the first authorization level corresponds to the second authorization level, and
assign the task to the first external device in the vehicle,
wherein the characteristics of the task comprise whether the information generated while the vehicle is traveling is used for executing the task,
wherein, when the assigned task for performing the operation of the vehicle fails on the first external device, the processor assigns the task to a second external device in the vehicle where the second authorization level corresponds to an identified authorization level of the second external device, and
wherein the processor is further configured to assign the task, which has been assigned to the first external device, to a third external device according to a change in available resources of the first external device.

2. The vehicle operating apparatus of claim 1, wherein the processor is further configured to:
receive information about the available resources of the first external device from the first external device, and
assign the task to the first external device by further taking into account the available resources.

3. The vehicle operating apparatus of claim 1, wherein the processor is further configured to select the second external device, to which the task is to be assigned, from among the plurality of external devices by taking into account authorization levels of the plurality of external devices.

4. The vehicle operating apparatus of claim 3, wherein the processor is further configured to:
determine an order of assigning the task by taking into account the authorization levels of the plurality of external devices, and
assign the task according to the determined order.

5. The vehicle operating apparatus of claim 3, wherein the processor is further configured to:
determine an order of assigning the task by taking into account available resources of the plurality of external devices, and
assign the task according to the determined order.

6. The vehicle operating apparatus of claim 1, wherein the processor is further configured to assign the task, which has been assigned to the first external device, to a fourth external device according to a disconnection of the communication connection from the first external device.

7. The vehicle operating apparatus of claim 1, wherein the processor is further configured to:
determine whether malicious software has been installed on the first external device, and
prevent any task from being assigned to the first external device on which the malicious software has been installed.

8. The vehicle operating apparatus of claim 1, wherein the memory is further configured to map and store information about an authorization level and at least one external device.

9. The vehicle operating apparatus of claim 1, wherein the assigned task fails on the first external device when the first external device fails to analyze a voice.

10. An operating method of an electronic apparatus of a vehicle, the method comprising:
performing a communication connection to a plurality of external devices in the vehicle;
identifying a first authorization level of a first external device of the plurality of external devices;
determining a second authorization level corresponding to a task according to characteristics of the task for performing an operation of a vehicle;
identifying that the first authorization level corresponds to the second authorization level; and
assigning the task to the first external device in the vehicle,
wherein, when the assigned task for performing the operation of the vehicle fails on the first external device, assign the task to a second external device in the vehicle where the second authorization level corresponds to an identified authorization level of the second external device, and wherein the assigning of the task comprises assigning the task, which has been assigned to the first external device, to a third external device according to a change in available resources of the first external device.

11. The method of claim 10, wherein the determining of the second authorization level comprises determining the second authorization level corresponding to the task according to whether information generated while the vehicle is traveling is used for executing the task.

12. The method of claim 10, wherein the assigning of the task comprises:
receiving information about the available resources of the first external device from the first external device, and
assigning the task to the first external device by further taking into account the available resources.

13. The method of claim 10, wherein the assigning of the task comprises selecting the second external device, to which the task is to be assigned, from among the plurality of external devices by taking into account authorization levels of the plurality of external devices.

14. The method of claim 13, wherein the assigning of the task further comprises:
determining an order of assigning the task by taking into account the authorization levels of the plurality of external devices; and
assigning the task according to the determined order.

15. The method of claim 13, wherein the assigning of the task further comprises:
determining an order of assigning the task by taking into account available resources of the plurality of external devices; and
assigning the task according to the determined order.

16. The method of claim 10, wherein the assigning of the task comprises assigning the task, which has been assigned to the first external device, to a fourth external device according to a disconnection of the communication connection from the first external device.

17. The method of claim 10, further comprising:
determining whether malicious software has been installed on the first external device,
wherein the assigning of the task comprises preventing any task from being assigned to the first external device on which the malicious software has been installed.

18. The method of claim 10, further comprising:
partitioning system resources of a computing system into virtual zones;
designating accessibility of the virtual zones according to each of the first and second authorization levels; and
setting the first external device to access only a specific virtual zone among the virtual zones according to the first authorization level of the first external device.

19. At least one non-transitory computer-readable recording medium having recorded thereon a program for performing the method of claim 10 on a computer.

* * * * *